US010839327B2

(12) United States Patent
Clark et al.

(10) Patent No.: US 10,839,327 B2
(45) Date of Patent: Nov. 17, 2020

(54) MEASURE FACTORY

(71) Applicant: Dimensional Insight Incorporated, Burlington, MA (US)

(72) Inventors: James Clark, Andover, MA (US); Frederick A. Powers, Sudbury, MA (US); Daniel J. Jablonski, Stoneham, MA (US); Matthew J. Gorman, Wellesley, MA (US); George M. Dealy, Medfield, MA (US)

(73) Assignee: DIMENSIONAL INSIGHT INCORPORATED, Burlington, MA (US)

( * ) Notice: Subject to any disclaimer, the term of this patent is extended or adjusted under 35 U.S.C. 154(b) by 198 days.

(21) Appl. No.: 15/856,542

(22) Filed: Dec. 28, 2017

(65) Prior Publication Data

US 2018/0181897 A1    Jun. 28, 2018

Related U.S. Application Data

(63) Continuation of application No. 15/445,692, filed on Feb. 28, 2017, now Pat. No. 10,445,674.
(Continued)

(51) Int. Cl.
*G06F 3/14* (2006.01)
*G06Q 10/06* (2012.01)
(Continued)

(52) U.S. Cl.
CPC ....... *G06Q 10/06316* (2013.01); *G06F 3/048* (2013.01); *G06F 3/0484* (2013.01);
(Continued)

(58) Field of Classification Search
CPC .................................................... G06F 3/14
(Continued)

(56) References Cited

U.S. PATENT DOCUMENTS 5,283,399 A * 2/1994 Fujino ................... B66B 1/2458
187/382
6,499,017 B1   12/2002 Feibelman et al.
(Continued)

FOREIGN PATENT DOCUMENTS

WO    2015136395 A1    9/2015

OTHER PUBLICATIONS

Cheng, "Integrating Data and Business Rules with a Control Data Set in SAS", CACI International Inc., Paper 3461-2015, 2015, pp. 1-11.
(Continued)

*Primary Examiner* — Ruay Ho
(74) *Attorney, Agent, or Firm* — GTC Law Group PC & Affiliates

(57) ABSTRACT

A measure factory for generating analytic measures includes data sets representing business activities arranged as columnar arrays with each column being associated with a distinct source rule that applies to the column when it is used as a data source. The measure factory includes factory rules that govern which operations on available data sources may be executed under what conditions in the measure factory, such as by taking into account the source rules and other applicable factory rules. A factory rule execution hierarchy governs the execution of ready factory rules that lack dependency on other factory rules before executing ready factory rules that have dependency on other factory rules. A script generation facility generates a script to process the plurality of factory rules according to the factory rule execution hierarchy.

13 Claims, 20 Drawing Sheets

Related U.S. Application Data

(60) Provisional application No. 62/301,136, filed on Feb. 29, 2016.

(51) Int. Cl.
  *G06F 16/00* (2019.01)
  *G06F 16/26* (2019.01)
  *G06F 3/048* (2013.01)
  *G06F 3/0484* (2013.01)

(52) U.S. Cl.
  CPC .............. *G06F 16/00* (2019.01); *G06F 16/26* (2019.01); *G06Q 10/06* (2013.01); *G06Q 10/067* (2013.01)

(58) Field of Classification Search
  USPC ....... 715/708; 705/7.25, 35; 718/1; 187/382; 379/202.01
  See application file for complete search history.

(56) References Cited

U.S. PATENT DOCUMENTS

| | | | |
|---|---|---|---|
| 7,685,571 B2 | 3/2010 | Schulte et al. | |
| 7,761,480 B2 | 7/2010 | Toledano et al. | |
| 8,438,074 B2 | 5/2013 | Serbanescu | |
| 8,732,213 B2 | 5/2014 | Sowell et al. | |
| 8,832,020 B2 | 9/2014 | Landy et al. | |
| 9,087,138 B2 | 7/2015 | Zhou | |
| 9,208,212 B2 | 12/2015 | Niehoff et al. | |
| 9,229,607 B2 | 1/2016 | Powers et al. | |
| 9,274,668 B2 | 3/2016 | Powers et al. | |
| 10,445,674 B2 | 10/2019 | Clark et al. | |
| 10,467,550 B1 | 11/2019 | Gupta et al. | |
| 2002/0188538 A1* | 12/2002 | Robertson | G06Q 10/06311 705/35 |
| 2004/0153576 A1 | 8/2004 | Hansmann et al. | |
| 2006/0010439 A1 | 1/2006 | Majidian | |
| 2006/0178943 A1 | 8/2006 | Rollinson et al. | |
| 2007/0130546 A1 | 6/2007 | Harris et al. | |
| 2008/0109283 A1 | 5/2008 | Binnie et al. | |
| 2008/0167909 A1 | 7/2008 | De Marcken | |
| 2009/0089248 A1 | 4/2009 | Alexander et al. | |
| 2009/0172035 A1 | 7/2009 | Lessing et al. | |
| 2010/0153862 A1 | 6/2010 | Schreiber | |
| 2011/0055195 A1 | 3/2011 | Reitter et al. | |
| 2011/0178838 A1 | 7/2011 | Ravichandran | |
| 2011/0231454 A1 | 9/2011 | Mack | |
| 2012/0041849 A1 | 2/2012 | Blumenthal et al. | |
| 2012/0082304 A1* | 4/2012 | Byrne | H04M 3/568 379/202.01 |
| 2012/0303378 A1 | 11/2012 | Lieberman et al. | |
| 2013/0046569 A1 | 2/2013 | Miller et al. | |
| 2013/0165238 A1 | 6/2013 | Batista | |
| 2013/0275612 A1 | 10/2013 | Voss et al. | |
| 2014/0053070 A1 | 2/2014 | Powers et al. | |
| 2014/0316843 A1 | 10/2014 | Bukovec et al. | |
| 2015/0019516 A1 | 1/2015 | Wein et al. | |
| 2016/0086120 A1 | 3/2016 | Powers et al. | |
| 2016/0275453 A1 | 9/2016 | Powers et al. | |
| 2016/0321589 A1 | 11/2016 | Powers et al. | |
| 2017/0270452 A1 | 9/2017 | Clark et al. | |
| 2018/0121853 A1 | 5/2018 | Clark et al. | |
| 2018/0121855 A1 | 5/2018 | Clark et al. | |
| 2020/0012986 A1 | 1/2020 | Clark et al. | |
| 2020/0019911 A1 | 1/2020 | Powers et al. | |

OTHER PUBLICATIONS

Matei, "Column-Oriented Databases, an Alternative for Analytical Environment", Database Systems Journal, vol. I, No. 2, 2010, pp. 3-16.

U.S. Appl. No. 16/510,327, filed Jul. 12, 2019, Pending, Frederick A. Powers.

U.S. Appl. No. 16/786,585, filed Feb. 10, 2020, Pending, Powers, Douglass B., et al.

U.S. Appl. No. 16/807,867, filed Mar. 3, 2020, Pending, Powers, Frederick A., et al.

* cited by examiner

| Charge ID | Account ID | Posting Date | Revenue Code | Charge |
|---|---|---|---|---|
| T_01 | A_01 | 2016/01/05 | 450 | 123.50 |
| T_02 | A_01 | 2016/01/05 | 110 | 40.50 |
| T_03 | A_02 | 2016/01/09 | 110 | 78.90 |
| T_04 | A_02 | 2016/01/09 | 110 | 10.00 |
| T_05 | A_02 | 2016/01/09 | 110 | -88.90 |
| T_06 | A_03 | 2016/02/04 | 170 | 56.70 |
| T_07 | A_03 | 2016/02/06 | 110 | 405.00 |
| T_08 | A_03 | 2016/02/06 | 110 | 12.25 |
| T_09 | A_04 | 2016/02/07 | 450 | 145.20 |
| T_10 | A_05 | 2016/03/18 | 110 | 0.00 |
| T_11 | A_05 | 2016/03/18 | 110 | 88.80 |
| T_12 | A_06 | 2016/04/01 | 170 | 101.80 |
| T_13 | A_06 | 2016/04/03 | 170 | 102.80 |
| T_14 | A_06 | 2016/04/05 | 110 | 103.80 |
| T_15 | A_07 | 2016/04/21 | 110 | 15.80 |
| T_16 | A_07 | 2016/04/22 | 450 | 421.00 |
| T_17 | A_07 | 2016/04/22 | 110 | -15.80 |
| T_18 | A_08 | 2016/04/27 | 110 | 70.50 |
| T_19 | A_08 | 2016/04/30 | 110 | 82.60 |
| T_20 | A_08 | 2016/05/01 | 110 | 123.80 |
| T_21 | A_09 | 2016/05/03 | 450 | 82.10 |
| T_22 | A_09 | 2016/05/03 | 170 | 57.00 |
| T_23 | A_09 | 2016/05/03 | 170 | -57.00 |
| T_24 | A_09 | 2016/05/04 | 110 | 111.50 |
| T_25 | A_10 | 2016/05/13 | 110 | 60.50 |
| T_26 | A_10 | 2016/05/13 | 110 | 12.40 |

FIG. 11

| Account ID | Patient Type | Admit Date | Discharge Date |
|---|---|---|---|
| A_01 | Inpatient | 2016/01/05 | 2016/01/05 |
| A_02 | Outpatient | 2016/01/09 | 2016/01/09 |
| A_03 | Inpatient | 2016/02/04 | 2016/02/07 |
| A_04 | Inpatient | 2016/02/07 | 2016/02/07 |
| A_05 | Outpatient | 2016/03/18 | 2016/03/18 |
| A_06 | Inpatient | 2016/04/01 | 2016/04/05 |
| A_07 | Inpatient | 2016/04/21 | 2016/04/23 |
| A_08 | Inpatient | 2016/04/27 | 2016/05/02 |
| A_09 | Inpatient | 2016/05/03 | 2016/05/04 |
| A_10 | Inpatient | 2016/05/12 | |

FIG. 12

| Revenue Code | mf_start_date | mf_end_date | Revenue Description |
|---|---|---|---|
| 110 | | | Room & Board |
| 170 | | | Nursery |
| 450 | | | Emergency Room |

FIG. 13

| mf_key | mf_start_date | mf_end_date | Newborn Bed Charge |
|---|---|---|---|
| 110 | | | |
| 170 | | | Y |
| 450 | | | |

FIG. 14

| Dashboard Section | Category | Measure Name | Measure Description |
|---|---|---|---|
| Inpatient | Volumes | Acute Admissions | The sum of Admissions that are considered to be Acute. This does not include Normal Newborns or account types specified as Non-Acute. |
| Inpatient | Volumes | Non-Acute Admissions | The sum of Admissions designated as Non-Acute. Normal Newborns are not included as Non-Acute. |
| Inpatient | Volumes | Other Non-Acute Admissions | Admissions that should be excluded from Acute Admissions and not already defined by one of the other Non-Acute categories: Rehab, Psych & Hospice. |
| Inpatient | Volumes | Acute Discharges | The sum of Discharges that are considered to be Acute. This does not include Normal Newborns or account types specified as Non-Acute. An account must have a valid Discharge Date (non-blank, valid format & valid date) in order to be considered a discharge. |
| Inpatient | Volumes | Non-Acute Discharges | The sum of Discharges for Non-Acute patients. |
| Inpatient | Volumes | Other Non-Acute Discharges | The sum of Discharges for other Non-Acute patients using the definitions outlined for Other Non-Acute Patients. |
| Inpatient | Volumes | Normal Newborns | The sum of Normal Newborns born in the hospital. |
| Inpatient | Volumes | Normal Newborn Discharges | The sum of Discharges for Normal Newborns using the definitions outlined for Normal Newborn. |
| Inpatient | Volumes | Acute Discharge Days | The sum of Discharge Days for Acute patients. |

FIG. 15

Dimensional | Hospital Operations
Insight

Back Home

Inpatient

Last Refreshed: 2016/02/16

Measures 1504 — All values (3)

Facility [All values (3)] ▽

Overview | Trends

| | MONTH TO DATE | | | CURRENT COMPLETE MONTH | | | YEAR TO DATE | | |
|---|---|---|---|---|---|---|---|---|---|
| | Feb-2016 | Jan-2016 | % +/- | Jan-2016 | Dec-2015 | % +/- | 2016 | 2015 | % +/- |
| Volumes | | | | | | | | | |
| Admissions | 214 | 205 | 4.4% | 422 | 447 | -5.6% ▶ | 422 | 529 | -20.2% ▶ |
| Acute Admissions | 214 | 205 | 4.4% | 422 | 447 | -5.6% ▶ | 422 | 529 | -20.2% ▶ |
| Non-Acute Admissions | 0 | 0 | | 0 | 0 | | 0 | 0 | |
| Newborns | 29 | 27 | 7.4% △ | 57 | 69 | -17.4% ▶ | 57 | 64 | -10.9% ▶ |
| Newborn Discharge Days | 45 | 39 | 15.4% ◀ | 87 | 117 | -25.6% ▶ | 87 | 102 | -14.7% ▷ |
| Newborn Discharges | 26 | 27 | -3.7% | 57 | 70 | -18.6% ▶ | 57 | 64 | -10.9% ▶ |
| Discharges | 204 | 225 | -9.3% ▶ | 443 | 434 | 2.1% | 443 | 550 | -19.5% ▶ |
| Acute Discharges | 204 | 225 | -9.3% ▶ | 443 | 434 | 2.1% | 443 | 550 | -19.5% ▶ |
| Non-Acute Discharges | 0 | 0 | | 0 | 0 | | 0 | 0 | |
| ED Admissions | 152 | 160 | -5.0% ◁ | 325 | 328 | -0.9% | 325 | 425 | -23.5% ▶ |
| IP Surgical Cases | 50 | 44 | 13.6% ▷ | 90 | 113 | -20.4% ▷ | 90 | 103 | -12.6% ▶ |
| Total Discharge Days | 689 | 746 | -7.6% ▷ | 1,524 | 1,471 | 3.6% | 1,524 | 2,482 | -38.6% ▶ |
| Acute Discharge Days | 689 | 746 | -7.6% | 1,524 | 1,471 | 3.6% | 1,524 | 2,482 | -38.6% ▶ |
| Total Patient Days | 722 | 708 | 2.0% | 1490 | 1490 | 0.0% | 1490 | 2068 | -27.9% ▶ |
| Acute Patient Days | 722 | 708 | 2.0% | 1490 | 1490 | 0.0% | 1490 | 2068 | -27.9% ▶ |
| Ratios | | | | | | | | | |
| Overall ALOS | 3.38 | 3.32 | 1.9% | 3.44 | 3.39 | 1.5% | 3.44 | 4.51 | -23.8% ▶ |
| Acute ALOS | 3.38 | 3.32 | 1.9% | 3.44 | 3.39 | 1.5% | 3.44 | 4.51 | -23.8% ▶ |
| Newborn ALOS | 1.73 | 1.44 | 19.8% ◀ | 1.53 | 1.67 | -8.7% ▷ | 1.53 | 1.59 | -4.2% △ |
| AMI ALOS | 3.33 | 1.80 | 85.2% ▶ | 2.18 | 6.56 | -66.7% ▶ | 2.18 | 3.80 | -42.6% ▷ |
| Admit % ED | 71.0 | 78.0 | -9.0% ▶ | 77.0 | 73.4 | 5.0% | 77.0 | 80.3 | -4.1% △ |
| Overall All Payer Case Mix | 1.2961 | 1.2737 | 1.8% | 1.2349 | 1.3454 | -8.2% ▶ | 1.2349 | 1.4112 | -12.5% ▶ |
| Acute All Payer Case Mix | 1.2961 | 1.2737 | 1.8% | 1.2349 | 1.3454 | -8.2% ▶ | 1.2349 | 1.4112 | -12.5% ▶ |
| Medicare Case Mix | 1.3569 | 1.2792 | 6.1% △ | 1.3162 | 1.5279 | -13.9% ▶ | 1.3162 | 1.6016 | -17.8% ▶ |

1802

1804 — MONTH TO DATE
1806 — CURRENT COMPLETE MONTH
1808 — YEAR TO DATE

Year-to-Date Summary  Beginning Month: 2016-01  Ending Month: 2016-11

FIG. 18

MEASURE FACTORY

CLAIM TO PRIORITY

This application is a continuation of U.S. patent application Ser. No. 15/445,692, filed Feb. 28, 2017.

U.S. patent application Ser. No. 15/445,692 claims the benefit of U.S. Provisional Patent Application No. 62/301,136, filed Feb. 29, 2016, titled TECHNIQUES FOR GENERATING BUSINESS WORKFLOW-SPECIFIC DATA SETS BY APPLYING BUSINESS RULES TO DISTINCT COLUMNAR DATA SETS, the entirety of which is incorporated herein by reference.

BACKGROUND

Facilities for providing assessment, feedback, and determining a source of substantive changes in business performance often require a high degree of sophistication by a business analyst and programmers to generate performance measurement and analysis that meet the need of individuals within diverse organizations. The bulk of the work required is rarely substantively transferrable to other use requirements and therefore presents an ongoing burden to organizations, and the like.

SUMMARY

A measure factory for generating analytic measures may include data sets representing business activities. The data sets may be arranged as columnar arrays with each column being associated with a distinct source rule that applies to the column when it is used as a data source. The measure factory may include factory rules that govern which operations on available data sources may be executed under what conditions in the measure factory, such as by taking into account the source rules and other applicable factory rules. The measure factory may use a factory rule execution hierarchy that executes ready factory rules that lack dependency on other factory rules before executing ready factory rules that have dependency on other factory rules. The measure factory may also include a script generation facility that generates a script to process the plurality of factory rules according to the factory rule execution hierarchy. A script processing facility of the measure factory may apply the generated scripts to the plurality of data sets.

The measure factory executes scripts independent of an order in which factory rules are presented to it. Therefore, the order of execution of scripts resulting from the script generation facility is independent of an order in which the factory rules are detected. As a result, the measure factory removes a need for any understanding by the user of the required order of execution when casting data sets, source rules, and/or factory rules.

As noted above, only ready factory rules are executed. A factory rule may be determined to be ready when data that the factory rule requires is available in one or more of the plurality of data sets. This basic dependency on availability of required data for executing a factory rule provides structure for determining an order of execution of factory rules. As an example of ready factory rules, data is treated as available when the factory rule uses only source rules or when it is generated by another factory rule the processing of which is complete for the data that the factory rule requires.

The hierarchy of measure factory execution indicates that a ready calc factory rule is applied before other factory rules. Likewise, a ready flag rule is applied after all ready calc rules have been applied to a given data set. In this way, the hierarchy of factory rule execution indicates an order of factory rule execution. As a further clarification of the execution hierarchy, the order of factory rule execution requires ready calc, flag, and lookup rules to execute before ready link rules which execute before ready plugin rules.

The script generation facility of the measure factory may generate a script based on a data graph derived from references to the data sets in the factory rules. Specifically, the script generation facility may generate the data graph as a step in a process to create the script. Also, the script generation facility may select among a plurality of factory rules based on an effectivity date associated with each of the plurality of factory rules and a script target date. The script target date may be the date on which the script is generated. Alternatively, the script target date may be an effectivity date of the script.

Methods and systems of a measure factory may include automated measurement of business performance through a combination of configuring a plurality of business performance measure factory rules as relationships of data source rules and of other factory rules; arranging a plurality of data sets with data representing business activities as columnar arrays wherein each column is associated with a distinct source rule; generating a script for processing the plurality of data sets from the factory rules based on a factory rule execution hierarchy that executes ready factory rules that lack dependency on other factory rules before executing ready factory rules that have dependency on other factory rules; and processing the plurality of data sets with the generated scripts to produce a business measure.

Other methods and systems described herein may include managing a business operation through insight into the operation generated by defining measures of data, such as data for operating the business, that characterize the operation at a level of abstraction that is independent of a source and/or location of data (or presence thereof) in the data that characterizes the operation. Optionally, references to data in the measures map to types of data and/or rules of the data that characterize the operation.

In another aspect of the measure factory methods and systems described herein, a measure factory output dashboard may be automatically configured based on factory rule definitions and an indication of at least one dimension of data that the factory rule impacts. The automatic configuration may cause arranging measures on the dashboard to visually align with the at least one dimension. The output dashboard may be automatically re-configured to display measures that, upon processing of a set of measure factory rules according to an execution hierarchy, correspond to a pattern of interest defined by an operator of the measure factory. In some cases, the pattern of interest is defined by departure of a measure from a historical range for the measure.

In another aspect of the measure factory methods and systems described herein, a measure factory user interface that facilitates defining a measure factory may include defining data set source rules that associate data within a plurality of columnar data sets, factory rules that govern at least one of extraction, transformation, computation, and loading of data within and among the plurality of data sets, user-selectable dimensions within the data set around which a user interface for viewing an output of the measure factory is arranged, and measures that are presented in the user interface.

Methods and systems for new and novel applications of a measure factory may include automated detection of difference of business-specific performance measures via automated computation of measures by applying source rules and factory rules to business-specific data. The differences may be automatically detected by comparing measures to normalized measures of the same type to identify departures from normal. The normalized measures may be established based on historical averages. They may also be established based on past time periods.

Other applications of a measure factory may include automated detection of at least one variance-impacting dimension of a plurality of dimensions of data that contribute to a measure of business performance of business activities that are represented at least in part by the data. In this application, detection may include: determining data that contributes to the measure of business activity; comparing differences between at least one of summaries of the determined data and elements of the determined data for a plurality of varying measures, the variances may be variation in measure time-periods; ranking at least a plurality of the differences from largest to smallest of the plurality of the differences; and presenting descriptive data for the top ranked differences to a user in an electronic user interface of a computer. The user interface may facilitate selecting the plurality of varying measures, such as by selecting timer periods.

Yet other applications of measure factory methods and systems may include automatically ranking by degree of impact, business activities that impact a change in business performance detectable from a comparison of a plurality of distinct time period-specific measures of business performance, the measures generated by processing data representing the business activities for the plurality of time periods, such as with a measure factory. Processing with a measure factory may include applying data processing scripts to data representing the business activities. The scripts may automatically be generated from one or more combinations of: a plurality of factory rules described as relationships of source rules and relationships of other factory rules; a plurality of data sets comprised of data representing the business activities arranged as a columnar array wherein each column is associated with a distinct source rule; and a factory rule execution hierarchy that indicates ready factory rules without dependency on other factory rules are executed before ready factory rules with dependency on other factory rules.

In any of the measure factory methods and systems described herein, factory rules that apply only to data within a specific data set may be executed independently of factory rules that apply to data within other data sets.

Another application of measure factory methods and systems may include projecting a difference of a business performance measure based on analysis of differences over time of data elements that, when processed through a measure factory, produce measures of the business performance.

Still another application of measure factory methods and systems may include suggesting a business activity as a source of a variance between two business-centric performance measures of a business, the measures generated by processing data representing activities of the business with a measure factory.

Suggesting an event that is characterized by data within a data set as a source of a variance between two business-centric performance measures of a business is an additional application of the measure factory methods and systems described herein. The measures may be generated by processing data representing activities of the business with a measure factory.

Automated variance detecting applications of a measure factory may include a business operational dashboard that automatically presents contributors to notable variances of a measure of business-performance over time. The contributors may be determined from sources of measures as defined by a set of factory rules of a measure factory. The contributors may further be tagged with a variance-impact confidence factor. Additionally, the dashboard may be automatically configured based on a determined role of a user of the dashboard. The contributors may be further filtered based on the determined role of the user so that sources of data for contributors associated with the determined role of the user are represented in the dashboard by descriptive information about role-specific business activities that correspond to the sources of data for the filtered contributors.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 11 depicts a table that represents a charges data set.

FIG. 12 depicts a table that represents an account data set.

FIG. 13 depicts a table that represents data used by a lookup factory rule.

FIG. 14 depicts a table that represents a data set used by a flag factory rule.

FIG. 15 depicts a table that represents measure configuration and description information.

FIG. 18 depicts a table of measures in a measure factory user interface.

DETAILED DESCRIPTION

Figure 1:
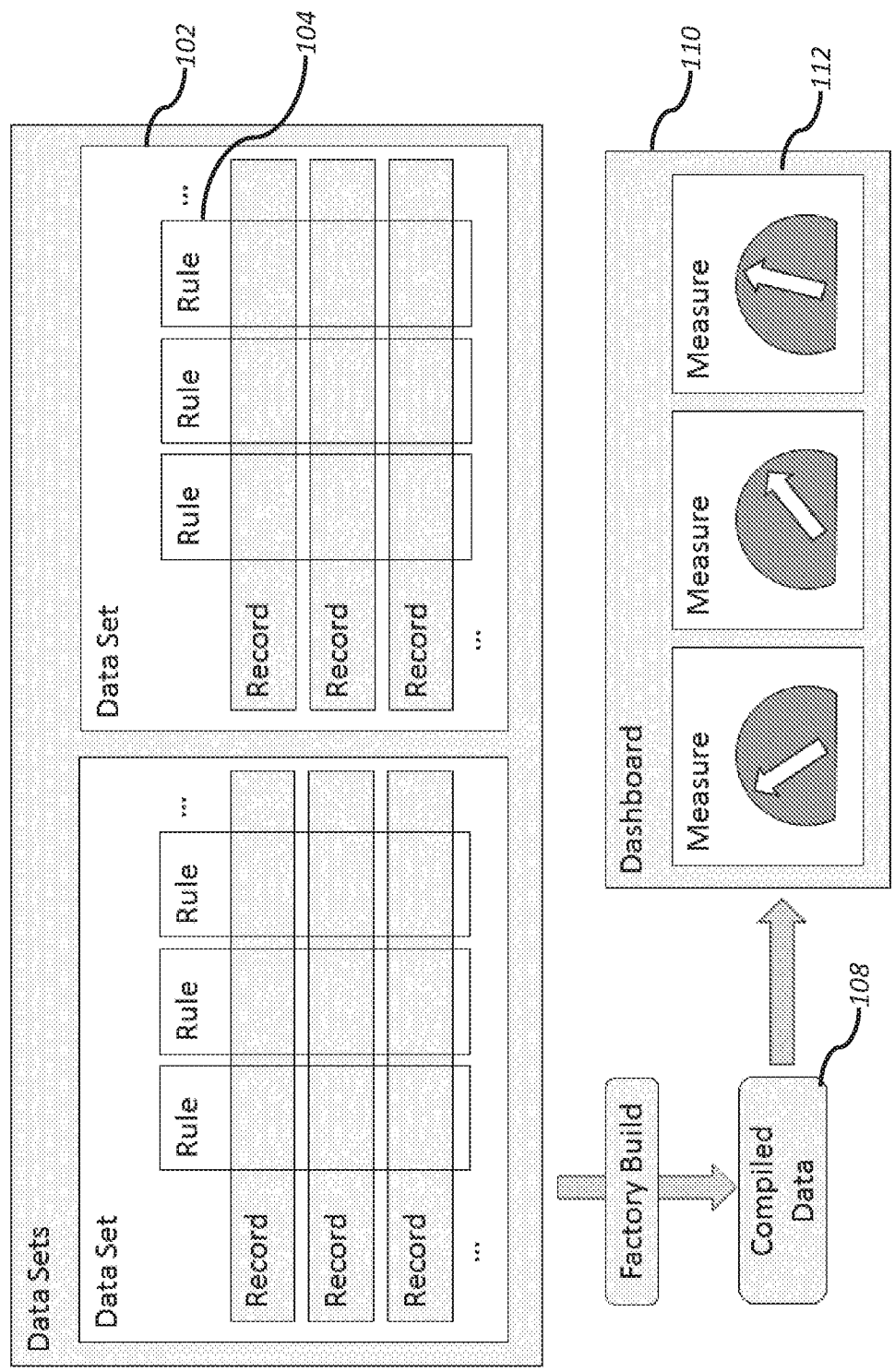
FIG. 1 depicts a diagram of elements of a measure factory.

Referring to FIG. 1, an embodiment of a measure factory, data sets, rules, measures and views are depicted. In embodiments, a data set 102 may be a collection of records, each of which may describe a particular kind of object, event, or relationship. Typically, data sets include data that represent some aspect of a business or business process. As an example, an "Accounts" data set may have records for individual accounts of a business (e.g., an account maybe associated with a customer or patient of the business); there may be one record for each such account.

Records in a data set may have a number of facts, or individual pieces of information, associated with them. Individual records may have certain kinds of facts that are unique to the record (e.g., a record identifier). However, other kinds of facts may be common to some or all of the records in the data set. For simplicity, each common type of fact is referred to herein as a source rule 104 of the data set. Generally, each source rule 104 is common to all records in a data set 102. As an example, the Accounts data set may have rules such as "Account ID", "Admit Date", "Purchase Date", and the like. The "Admit Date" rule may indicate an admission date type of fact for each record.

Goals of the measure factory methods and systems described herein includes adding new rules (new types of facts) to a collection of data sets, and making it easier to create and manage a large number of rules. The measure factory methods and systems described herein may automate the definition, generation, and processing of the rules, so the people working with the business data can focus on the correctness of the rules for generating meaningful measures, independent of the implementation of those rules, such as in terms of the requirements for preparing data for each rule and the flow of data from source data sets to final data sets.

One structural output of applying the measure factory methods and systems described herein may be a set of data structures, e.g. enhanced and newly created data tables 108 that support business-centric uses of the data. One such use may be an interactive electronic user interface or dashboard 110 for operating a portion of a business associated with the data in the data sets 102. As an example, data output by a measure factory may be displayed in summary form, such as depicting a number of Accounts with Admit Dates occurring this month. The summary form may be a single number, such as 286. The measure factory methods and systems described herein may summarize data in many ways. Each such way of summarizing data may be called a "measure" 112. A measure is typically the result of applying some mathematical expression to a specific set of rule values from a collection of records in one or more data sets.

Figure 2:
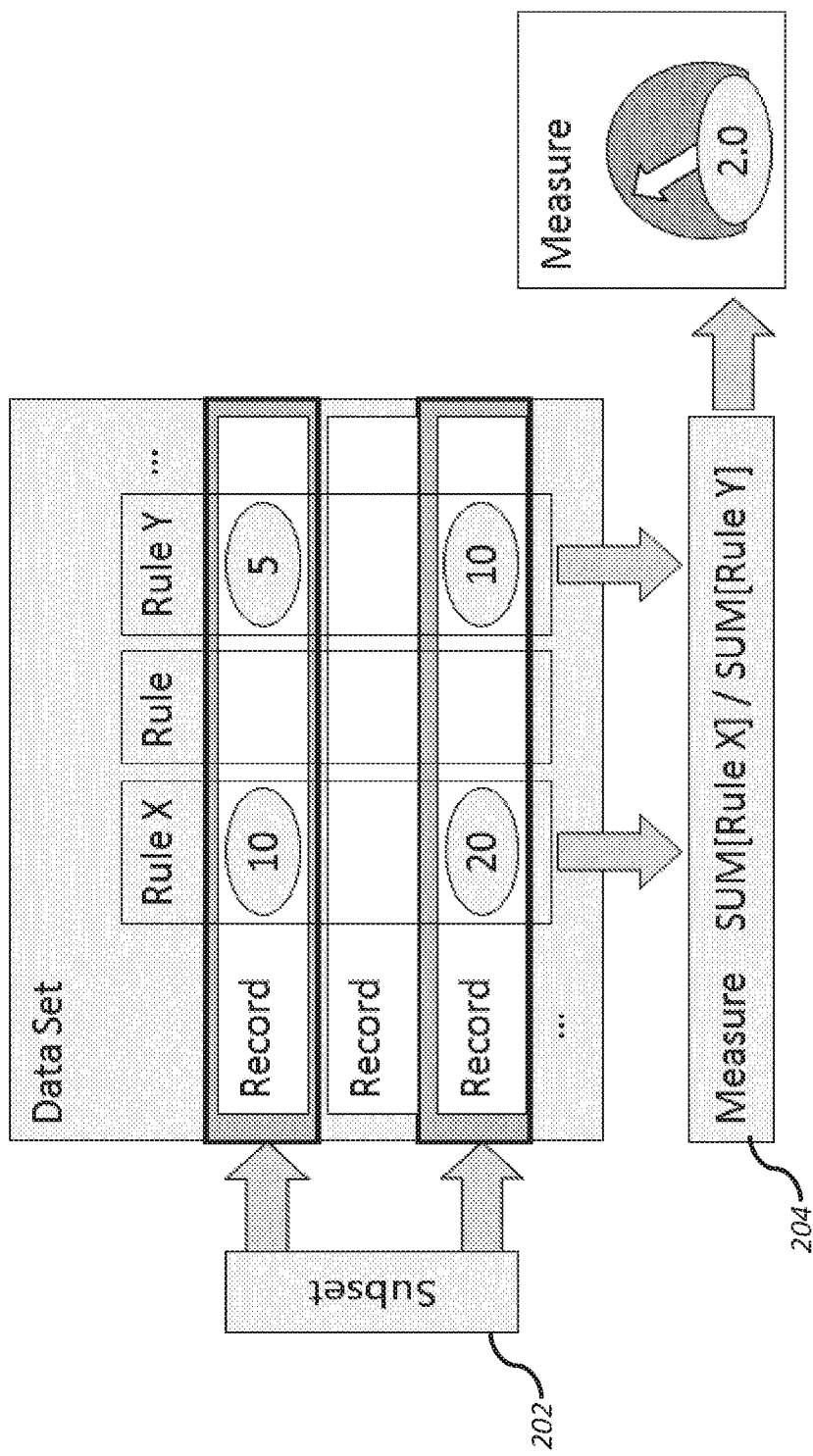
FIG. 2 depicts a diagram of data sets and rules of a measure factory.

Referring to FIG. 2 that depicts a diagram of data sets and rules of a measure factory, data sets 102 may be arranged as subsets of records. Subsets may be dynamically configured based on relationships of data in the records for specific rules. As an example, subset 202 comprising the first and third rows in the example embodiment of FIG. 2 may define data for rule X and rule Y that meet certain criteria, such as a non-zero value, a value relative to a threshold (e.g. above or below a threshold value) or relative to a set of thresholds (e.g. within or outside a range). A measure may result in a set of records from a data set, such as subset 202 being processed by a factory rule to produce a result, such as a summary, mathematical outcome, logical outcome and the like. In the example of FIG. 2, the measure 204 sums the values of records in subset 202 defined by rule x and divides that sum by the sum of values of records in subset 202 defined by rule y.

Measures may have associated data which helps to support rich displays, such as a description, a flag indicating whether the measures are "better" when it goes up or down relative to a prior time period or other measure, a set of preferred columns to access when analyzing the measure, and the like.

Measures may also be associated with a "view", which is an abstraction over the rules available in a data set. A view may assign specific rules to abstract rule concepts, to further separate a fact type from a corresponding rule. For instance, the abstract concept of "Date" may be specifically assigned to "Admit Date" for the "Admissions" measure, but it may be assigned to "Discharge Date" for the "Discharges" measure. This allows the dashboard to show the Admissions and Discharges measures together over a general time range (such as year-to-date), even though the two measures have a different concrete notion of which date rule is relevant to them.

More specifically, a view may be an abstraction of rules independent of what the underlying rule represents, e.g., different types of "date" can all be abstracted to a "date" view-level rule type. This way "admit date" and "discharge date" can both be treated as a "date" in a view-level "date" rule. As an example, a measure of admissions can reference a date value in admissions data set records. The date in these records would be an admission date. Similarly, a measure of discharges that accessed a data set of discharge records would reference the date in each record that would be a date of discharge. This is a simple abstraction example, but generally all rules to be abstracted to a view-level rule should be of the same general type (e.g., a date, a facility, a procedure or the like).

The measure factory methods and systems described herein may include different types of rules, such as source rules, factory rules, and the like. Exemplary types of rules are described in the following paragraphs and corresponding figures.

A first type of rule may be a source rule. Source rules may be associated with types or dimensions of data in a measure factory data set. As an example, a data set may be configured by extracting data from one or more external data stores, such as data stores, databases, data streams, and the like that may be associated with an aspect of a business for which the measure factory may be configured to analyze. A measure factory data set may preferably be configured as a columnar database (herein referred to as a cBase). The columns in such a cBase may be automatically made available as source rules in the data set. As source cBase data sets are processed by the measure factory, other types of rules (e.g., additional columns) may be added. Although not intended to be limiting, processing of one or more data sets by the measure factory may be referred to herein as a "factory build".

In addition to source rules, there are several types of factory rules that may be referenced during the generation of a measure factory processing deployment. Such factory rules may be used to define measures by a person or may be automatically configured into a set of cohesive data processing measure factory data processing operations.

Figure 3:
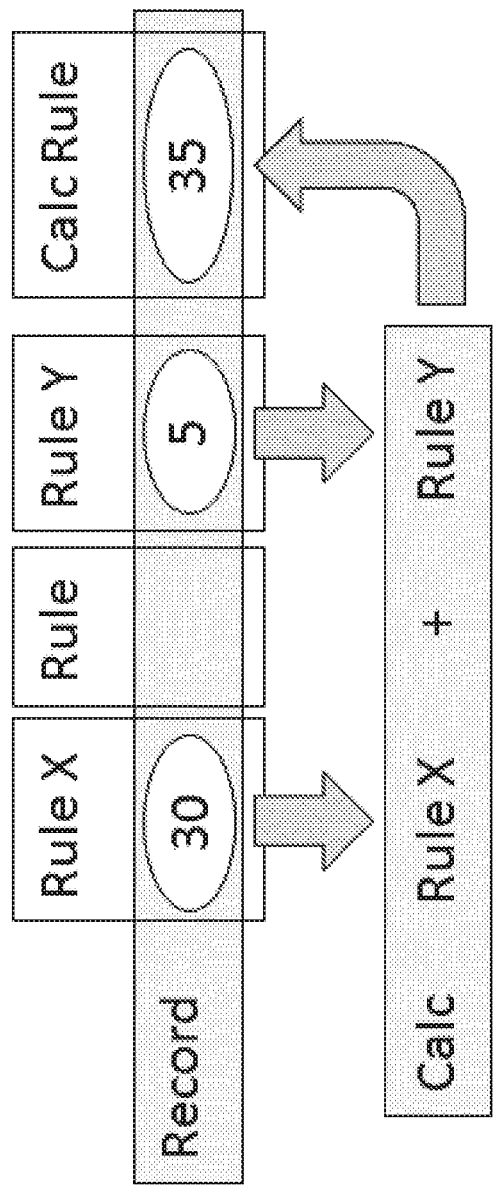
FIG. 3 depicts a calculation factory rule.

FIG. 3 depicts a first type of factory rule, specifically a calculation rule (herein referred to as a "calc" rule). A calc rule may generate new data that may be added to one or more of the records in a data set by applying one more mathematical expressions to data associated with existing rules in a data set. The use of a calc rule example of FIG. 3 defines a factory rule referred to as "Admission". This factory rule may be defined by a user as value ("Patient Type") "Inpatient" and value ("Admit Date")!=null. This could be interpreted as assigning a value to a new rule "InPatient" for each processed record (e.g., adding this new rule as a new column to a cBase data set, such as an Admissions data set). A script that could automatically be generated by the measure factory based on the factory rule definition above may simply be: calc-rule "Admission" 'value ("Patient Type")="Inpatient" and value ("Admit Date")!=null'. The result of such a rule may cause each processed record that has a non-null Admit Date value to be classifiable as an Inpatient record. The value "Inpatient" could be a binary value (e.g., 1 or 0, or may be a more involved value, such as a text string, formula, or the like).

Figure 4:
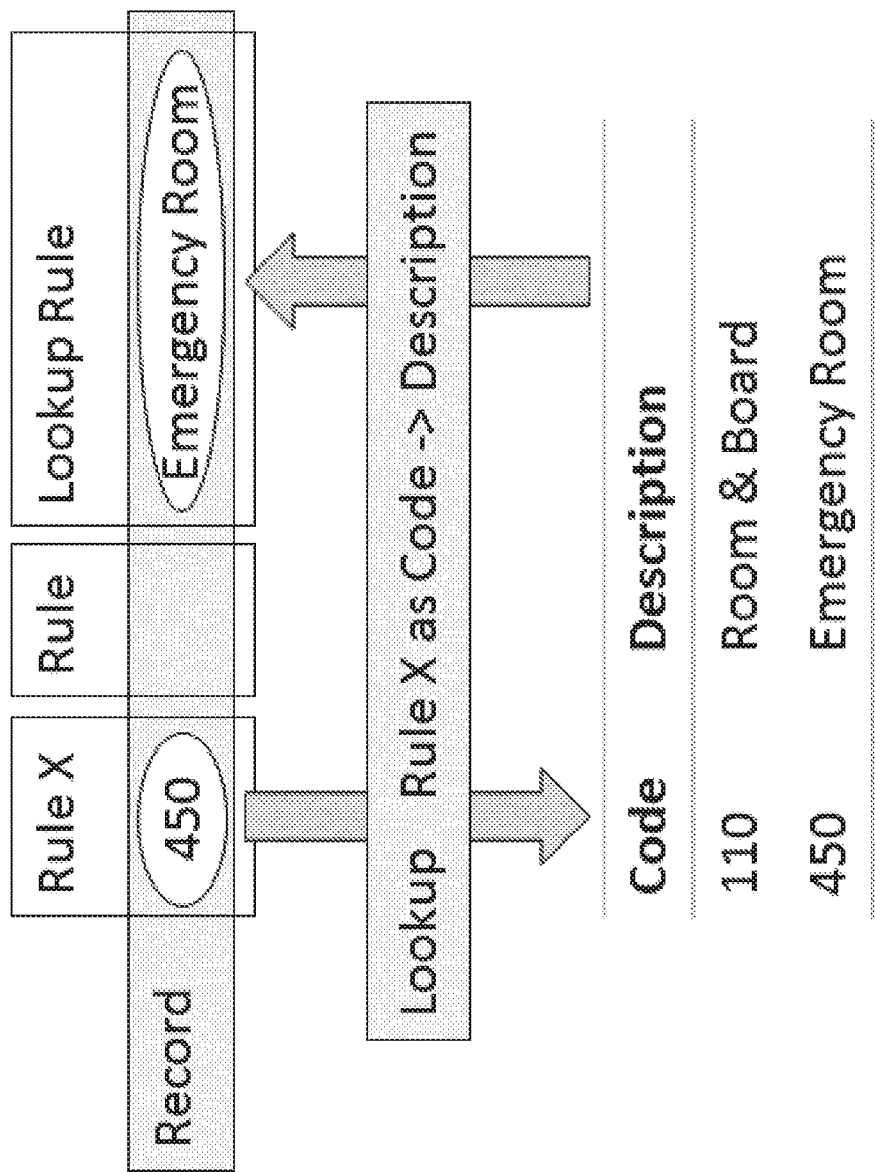
FIG. 4 depicts a lookup factory rule.

FIG. 4 depicts another type of factory rule that may perform data lookups for assigning one or more data values associated with one or more source rules into a group. A lookup rule may get information from a lookup file and may match certain values from certain rules in each processed record with values in the lookup table. The lookup table may be configured with a set of rows that include a lookup code that may be matched to the value of each processed data set record and a description value that may be added to each processed record in a new column associated with the rule for which the lookup is performed.

An exemplary use of a lookup rule is to convert codes into text descriptions. In the lookup factory rule example of FIG. 4, the lookup rule converts "Revenue Code" (depicted as "Rule X") to "Revenue Description" (depicted as "Lookup Rule"). A lookup file, would be accessed and the "Revenue Code" rule value in each processed cBase record would be used as an index into the lookup file. A corresponding "Revenue Description" value in the lookup file would be placed in a "Revenue Description" column of the processed record. An automatically generated script to define such a rule might comprise: lookup "Revenue Descriptions" {date rule="Posting Date"; key "Revenue Code"; lookup-rule "Revenue Description" }

In some cases, a lookup rule could be implemented as a calc rule, but lookups have advantages over plain calc rules. Lookups are easier to maintain. As an example of easier maintenance, one can modify the lookup values by editing the lookup table directory, and the lookup table can be generated by an external process. Lookup rules can also access an "effective date range" for each entry in the lookup table. Therefore, if a preferred mapping between an index and a description in the lookup table changes over time, the effective date range values in a lookup tale entry can reflect that change and return the mapped value appropriate to the time associated with the record. In an example, if Revenue Code 123 meant "Emergency Room—Other" for transactions that occurred before Jan. 1, 2015, but it meant "Urgent Care" for transactions on or after that date, then the lookup table can be set up to facilitate accessing the appropriate Revenue Code 123 for each execution of the measure factory. The effective date range may be matched to a target date range for the execution of the measure factory. In this way, the data added to the cBase column for each processed record may correspond to a preferred effective date. Further in this example, a target date may be predefined, may be calculated by a factory rule, may be referenced in the processed record, and the like.

Figure 5:
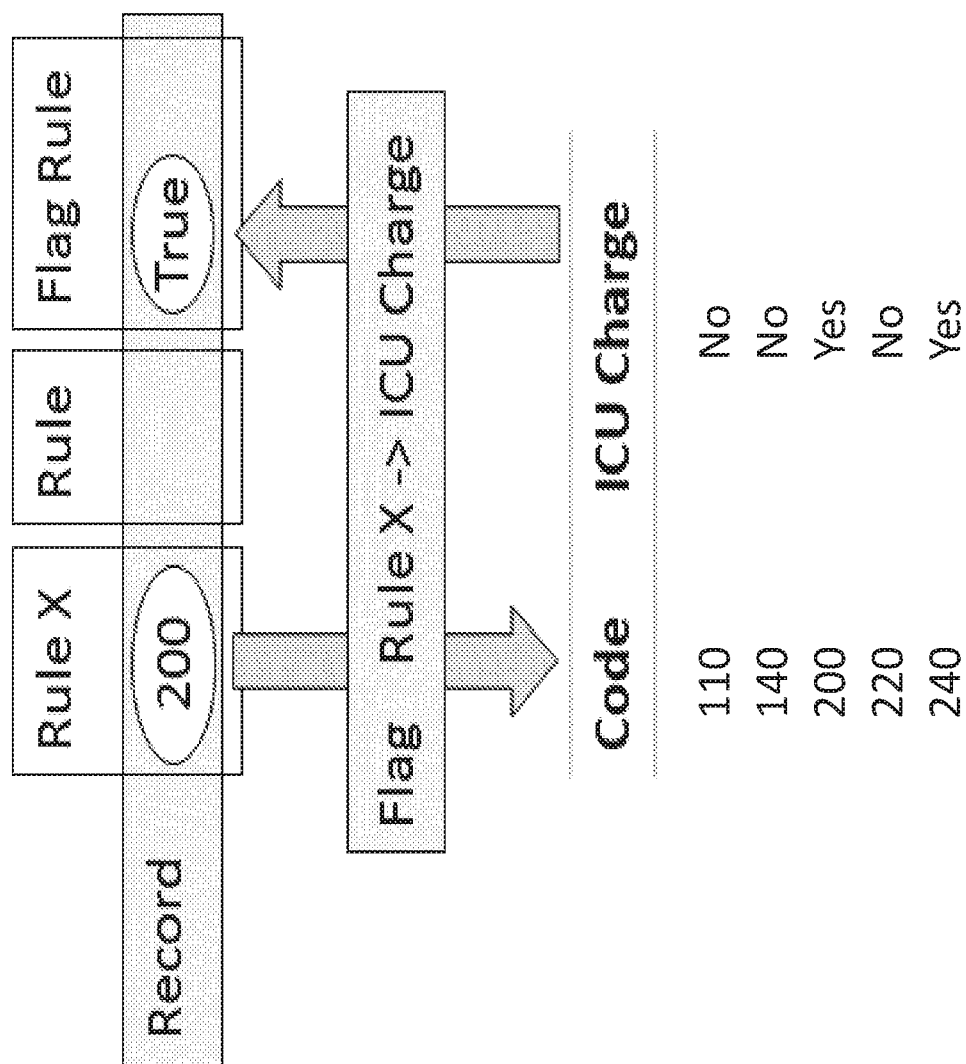
FIG. 5 depicts a flag factory rule.

Referring to FIG. 5, another factory rule is depicted for flagging certain records in the cBase based on values in the record. Whereas a lookup rule can result in any string or other value being loaded to a cBase column in each processed record in a data set based on other values in the record, a flag rule results in one of two values being added to the cBase record. This rule is generally useful for mapping records, based on a select rule value (e.g., Revenue code) as either included or excluded from a particular set of records. In the example of FIG. 5, records with revenue code 110 are not included in an ICU charge group of records, whereas records with revenue code 200 are included. Additional entries in the flag table could allocate records with other revenue codes to be included or excluded from the ICU charge group. In this way, further processing can be based on whether the record is an ICU charge (included in the ICU charge group) or not (excluded from the ICU charge group).

An automatically generated script for processing records with the flag rule of FIG. 5 may comprise: flag-table "Revenue Flags" {date rule="Posting Date"; key rule="Revenue Code"; flag-rule "ICU Charge"}. When this script executes, Revenue Codes in processed records will be matched to the Revenue Flags file entries. Where there are matches, if the record value Posting Date is within the effective dates for the matched Revenue Flags file entry, a new value (e.g., true/false) will be added to the "ICU Charge" cBase column in the processed record.

Figure 6:
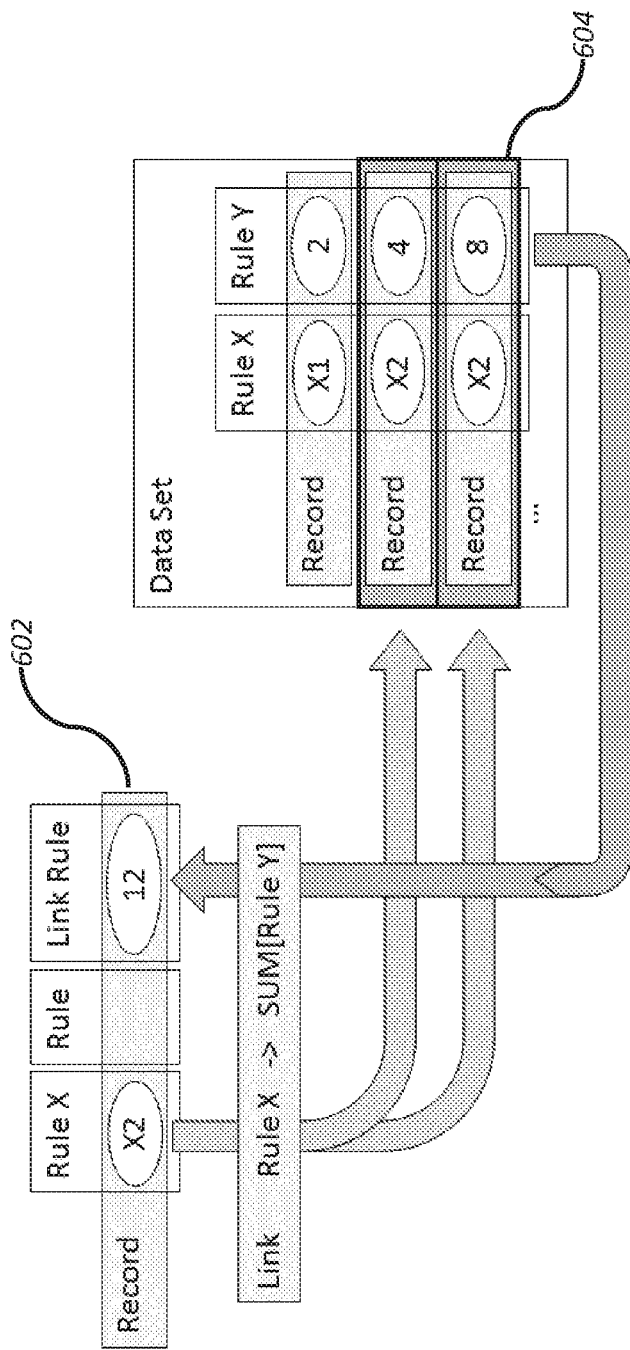
FIG. 6 depicts a link factory rule.

Referring to FIG. 6, a factory rule for linking data among data sets is depicted. A link rule may also be used to move or duplicate data from one data set to another. A link rule may use a "key", which may be a rule in an origin data set that is used to match data records for the corresponding rule in another data set herein called a matching data set. The link rule may facilitate connecting or associating records from the two data sets which share the same value for the selected key. As an example of a link rule key, both an Accounts (origin) and a Charges (matching) data set may have an "Account ID" rule in them. Data in the two data sets for records that have the same value in the "Account ID" rule (or column in a columnar data set) may be used in an operation associated with the link rule. The operation associated with the link rule, may include a summarizing mathematical expression that may be applied to the records in matching data set. The result of the expression may be placed in the corresponding record(s) in the origin data set. In the example of FIG. 6, an origin data set 602 includes a rule X that is used as a key for a link rule. A record in the origin data set 602 has a value of X2 for the key. This value X2 is used to find records in the matching data set 604 that have the same key value. An expression associated with the link rule causes other values in the matching records, such as by reciting an operation to perform on specific rules (e.g., Rule Y in FIG. 6) in the matching data set. The operation is performed on all records in the matching set that contain the key value. In the example of FIG. 6, the values in Rule Y of each corresponding record in the matching data set are summed. The result is loaded into a new link rule column in the appropriate record in the origin data set. In the example of FIG. 6, records in an Accounts data set will be updated with a total of charges found in the Charges data set for records in the Charge data set that match the Account ID of each record in the Accounts data set. This results in each Accounts record now including a total of charges for the account. While a summing expression is used in the example of FIG. 6, any logical, mathematical, or other expression may be used.

A script that may be automatically generated and executed by the measure factory for the link rule example of FIG. 6 may be: link "Charges" {key "Account ID"; link-rule "Has ICU Charge" 'count( )>0' filter='value ("ICU Charge")' }. In this example, a default operation performed by the link rule is a mathematical summation of the ICU charges for each Account ID found in the Accounts data set.

Through the automated processing of factory rule definitions as described later herein, multiple-dependencies among data sets may be safely ignored by the user. The measure factory determines which rules (e.g., operations) must be performed to satisfy any cross-data set dependencies.

Figure 7:
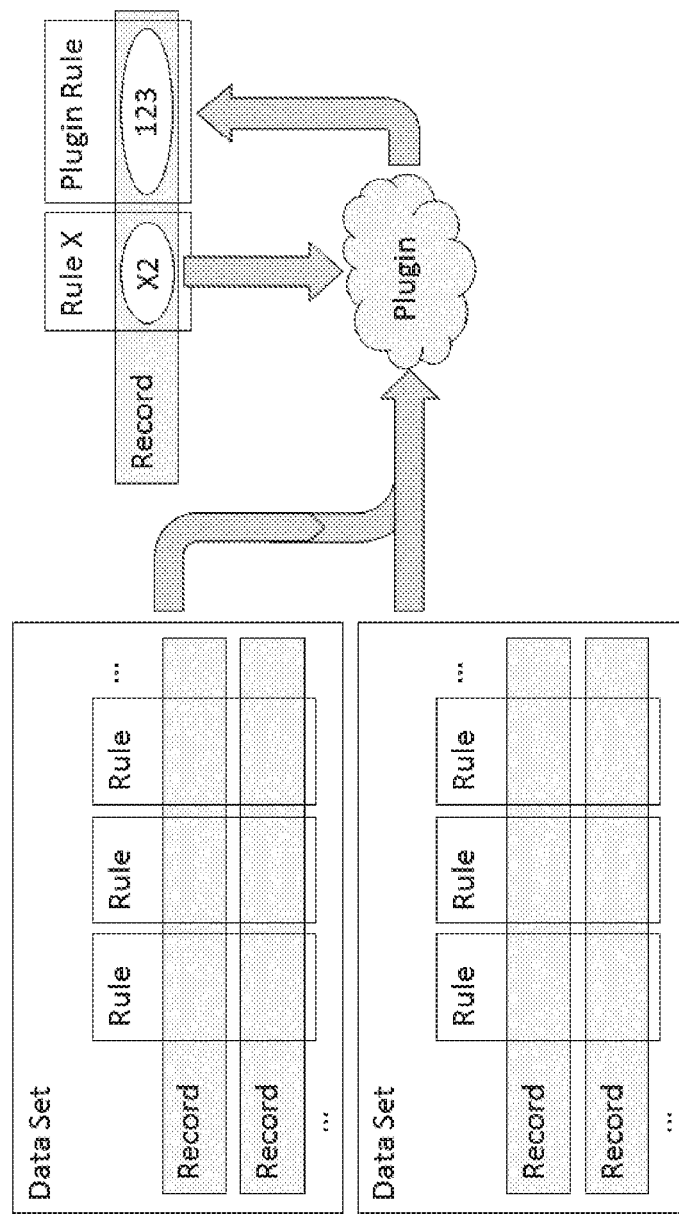
FIG. 7 depicts a plugin for use with a measure factory.

FIG. 7 depicts another type of factory rule that provides a rich data processing capability to a user without overly complicating the measure factory, specifically a plugin rule. As an example, a plugin rule is available to produce rules that are not possible using the other rule types. A plugin rule may execute an external process to determine the rule values, deliver data based on those values to the external process that performs operations with the delivered data from the data sets, and then join the result of that external process back into the data set(s). This allows the user to inject more complicated logic into the factory while still taking advantage of the measure factory's automatic management of the data flow.

As an example of a plugin rule, computing whether an Admission is a "Readmission" may need to determine if the current Admission encounter occurred within a certain number of days after a previous encounter of the same patient. This requires looking at data outside of each individual account record (e.g., prior account encounter records). A plugin rule can be defined to handle readmission calculations.

A readmission plugin rule may be configured by a user and the measure factory may automatically generate the following script for it: plugin "Readmission" {input "Accounts" {column "Account ID"; column "Admission"; column "Admit Date"; column "Discharge Date"; column "DRG"; column "MRN"} dimension "Account ID"; plugin-rule "Readmission"}

A feature of a measure factory is its ability to automatically manage the application of rules, so that a user configuring the factory can focus on defining factory rules. The methods and systems of a measure factory free the user from needing to track when data that may be needed for a factory rule is ready for use. The measure factory isolates the user activity of defining rules from their processing.

A measure factory may process data using a "swim lane" method, embodiments of which are described in U.S. provisional patent application Ser. No. 62/301,136, the entirety of which is incorporated herein by reference. Each data set may be built up from a source table, rule by rule, until all rules are applied. The use of a swim lane analog is useful to visualize the rule execution hierarchy and overall data processing approach. All processing that can be performed on data in a data set without requiring access to other data sets (that may also be being processed) is performed within the swim lane of the data set, thereby providing independent processing of each data set in its own swim lane without affecting other data sets. Most of the time, a data set will stay in its swim lane, but for certain rule types (e.g., link and plugin) it may be necessary to transfer data from one lane to another.

Figure 8:
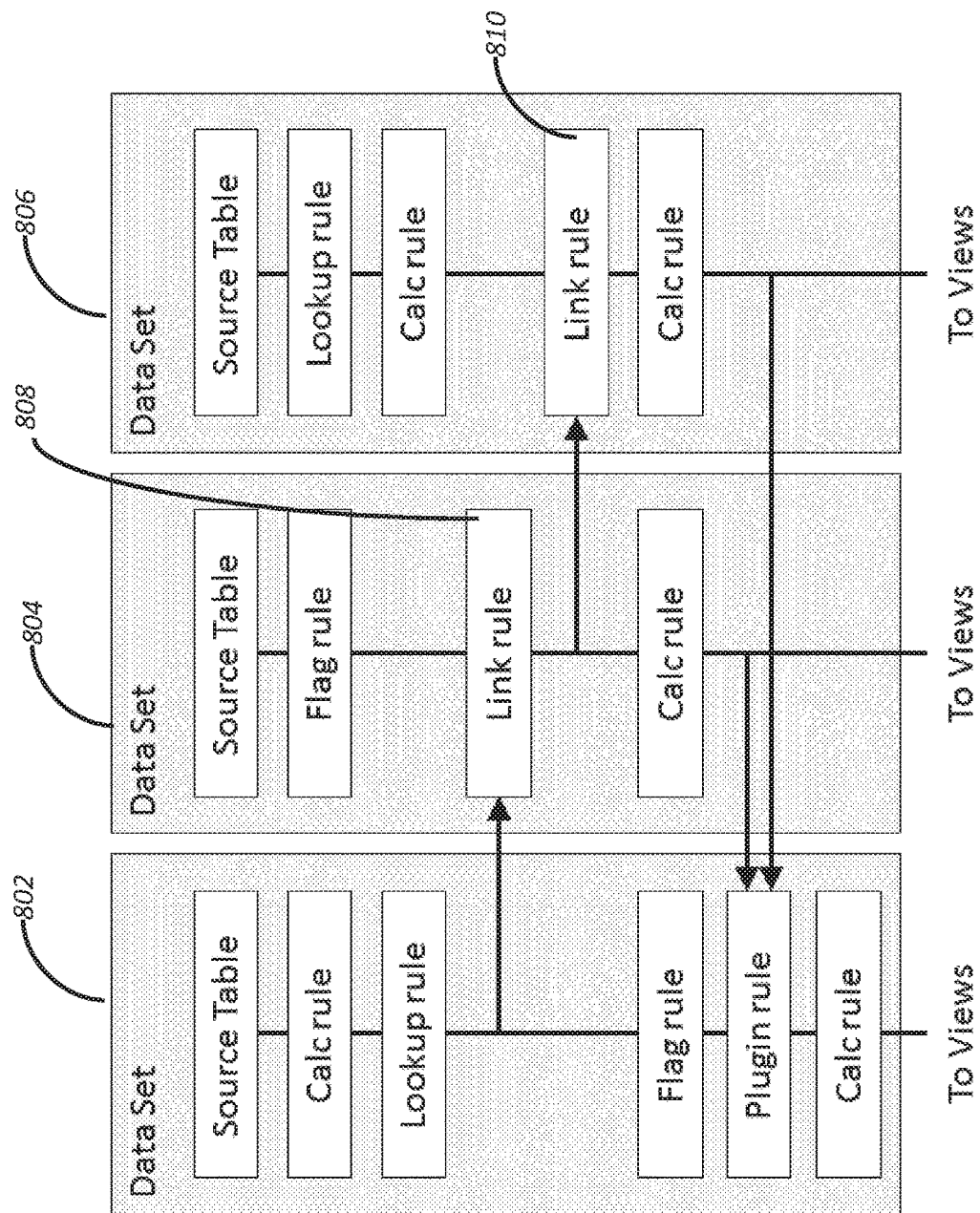
FIG. 8 depicts measure factory data set rule processing.

FIG. 8 depicts an embodiment of a measure factory data flow process for three data sets (802, 804, 806). A data set 802 performs a calc factory rule and a lookup factory rule before pausing processing to provide data to a link rule 808 operating in a script for data set 804. The data set 802 rules processing continues once the lookup rule is complete. A script for processing the data set 802 resumes by processing a flag rule and then executing a plugin rule 808 for accessing data from the data sets 804 and 806. The rule script of data set 802 finishes by executing a calc factory rule.

A script for processing rules for the data set 804 processes a flag rule followed by the link rule 808 through which it accesses summary data from data set 802 after completion of that data set's lookup rule. Processing may pause temporarily while the script for data set 806 processes a link rule 810 that accesses data from data set 804. Note that the data generated by the script for data set 804 may include summary data from data set 802 at the time that the link rule 810 in the script for data set 806 executes. In this way, the script for data set 806 is configured to execute its link rule 810 only after data in data set 804 includes the summary data generated from executing the link rule 808. While a user definition of the link rule 810 may require the summary, data generated by link rule 808 execution, the user does not have to explicitly recite that link rule 808 be performed before executing link rule 810. A measure factory automated script processing facility determines this dependency based on the link rule 810 definition, an understanding of the data in each of the data sets, link rule 808 definition and the like. This may, for example, be determined from a data graph generated by the measure factory during generation of the scripts.

Methods and systems of a measure factory as described herein may include execution of a script of rules that may be automatically generated by the measure factory. This automated rule execution may involve executing a large number of rules across a large number of data sets. Rules may process data within a single data set or may require use of data from multiple data sets. A rule processing set or algorithm may determine a general order or hierarchy of rule processing. One aspect of such an algorithm is the notion that only rules for which data is available can be processed. This may be referred to herein as a rule being ready. Therefore, a rule is considered "ready" if it does not depend on a rule which hasn't yet been applied so that data required by rule is not yet available. The algorithm facilitates only applying a rule until it is ready. The measure factory rule processing algorithm indicates that all ready calc, flag, and lookup rules are to be processed in order. These rules would not be executed because they would not be ready if they require data output from any rule that has not yet executed. Therefore, an order of execution of calc, flag, and lookup rules are based on availability of data within the given data set. After applying all ready calc, flag, and lookup rules, a measure factory rule processing facility may process ready link and plugin rules. Processing continues by processing more calc, flag, and lookup rules that are ready that have not yet been executed. Execution of rules continue with this general hierarchy until all rules are complete.

Figure 9:
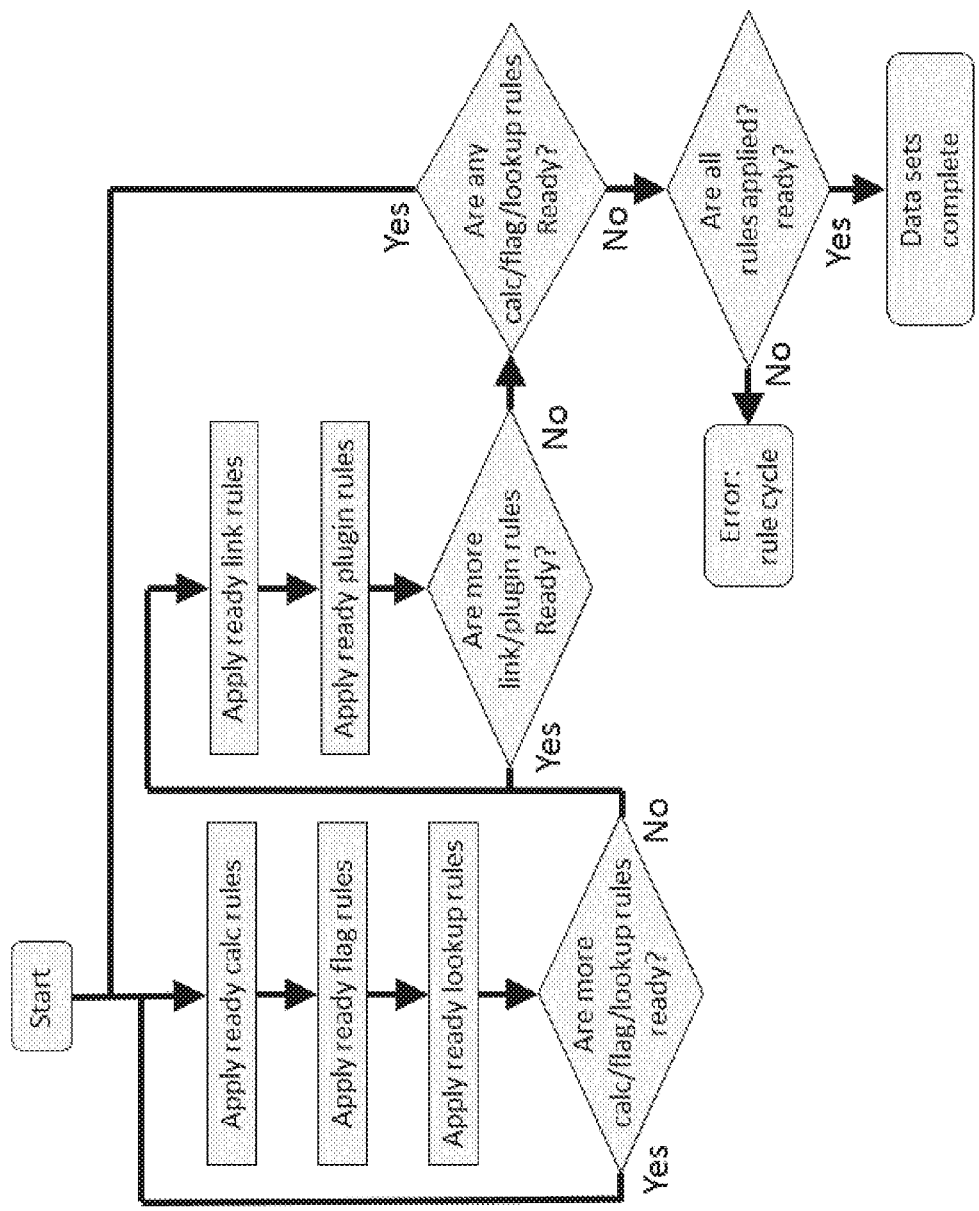
FIG. 9 depicts a flow chart of processing ready rules.

FIG. 9 depicts an exemplary flow of rule execution based on this measure factory rules processing algorithm. All ready rules are executed across all data sets in an instance of measure factory rule processing so that at any time rules that do not depend on unavailable data may be executed. This facilitates highly efficient use of computer resources, scalability of the number of data sets, rules, and measures. It also facilitates use of distributed processing architectures and the like. Rules processing may, for example be distributed across networked processors so that data operations can be localized for data sets that are stored locally with each networked processor.

In embodiments, a columnar database processing engine referred to in U.S. patent application Ser. No. 15/164,546 the entirety of which is incorporated herein by reference as a Spectre data processing engine may be employed to perform one or more of the script executions. In general, the Spectre data processing engine operates on and generates cBase compatible columnar databases, such as the data sets described and used herein. Therefore, any reference to processing one or more data sets with a measure factory script may be performed by the Spectre data processing methods and systems described herein and/or incorporated herein by reference. Spectre provides specific benefits to a computer system operating the Spectre data processing engine. One such benefit is improvement of computer performance over prior art data processing engines due to the highly efficient computing technology that Spectre employs. Spectre works directly with columnar data bases such as a cBase, which may be the data set used by the measure factory. Features associated with Spectre, such as a semantic knowledge plan that Spectre references and any other infrastructure on which Spectre is described as operating and/or that Spectre may reference or access in association with processing data sets is also incorporated herein by reference in its entirety. In embodiments one or more of the automatically generated measure factory scripts described herein may represent a Spectre compatible semantic knowledge plan. Additionally, the highly efficient processing mechanisms utilized by Spectre including, for example, query optimization, machine code optimization, and execution may be used in any step of the measure factory script generation and execution as appropriate. Further as noted in the documents referenced herein, the data sets, such as columnar data sets, described herein may be structured and/or optimized and/or tailored for efficient processing by a Spectre-like data processing engine. These aspects of the Spectre data processing engine are described here as examples of only some of the benefits and features of applying the Spectre data processing engine to measure factory operations.

Figure 10:
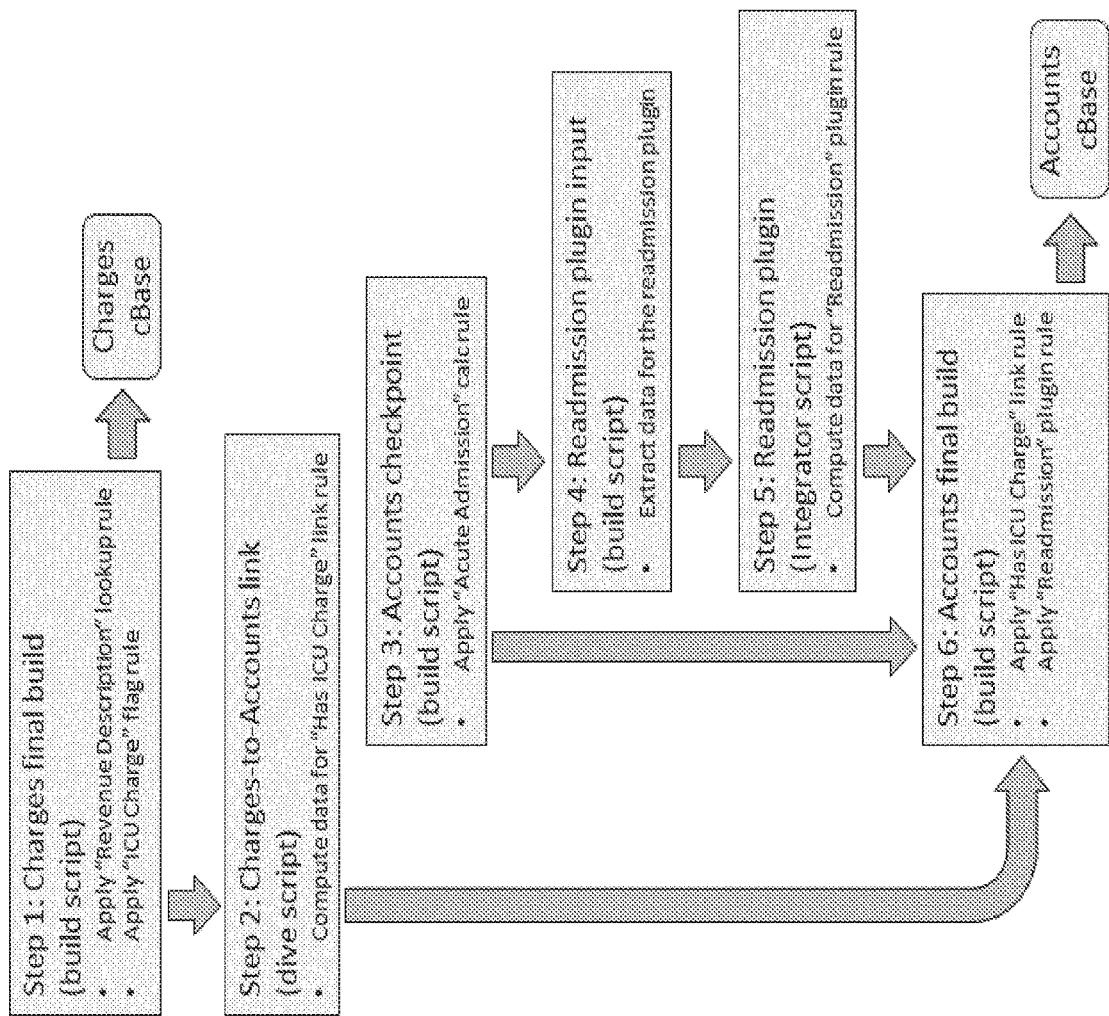
FIG. 10 depicts a measure factory embodiment for generating a charges cBase and an Accounts cBase.

FIG. 10 depicts an exemplary measure factory script processing flow to produce two cBase compatible data sets, a Charges data set and an Accounts data set. References to "build script" and "dive script" may indicate types of Spectre-compatible scripts that may have syntax, structure, formatting, and the like that may benefit from the processing capabilities and optimizations of the Spectre data processing engine. Reference(s) to "integrator script" may indicate a script that performs an integration process, such as integrating data from multiple data sets and optionally other data sources.

The individual user-defined or predefined factory rules may be combined and/or individually converted, via an automated script generation process, into one or more Spectre-compatible scripts, such as a build script. The automated script generation process will label a script as "checkpoint" if it produces an intermediate version of a cBase. Likewise, an automatically generated script that produces a final version of a cBase file may be labelled as "final". These labels, while useful for human inspection of scripts, may have no actionable attributes. On the other hand, during processing of a data set, any script that is labelled "checkpoint" will be processed by a Spectre-like data processing engine before processing a script labelled "final" to ensure proper integrity of the resulting data sets.

The Spectre technology may employ a combination of Spectre-compatible scripts for executing some factory rules, such as a link rule. In an example, of multi-script link rule processing, a dive-like script may be processed to summarize data from a matching data set (e.g., a data set that may have multiple records for each unique record in an origin data set). This dive-like script execution may be followed by execution of a build-like Spectre compatible script that joins the summarized data from the matching data set into the corresponding records in the origin data set.

The measure factory methods and systems may further improve computer performance by selectively eliminating certain calc output data columns from resulting cBase data sets. In general, a measure factory produced cBase data set will include a column for each rule processed during the factory operation on the data set. Generally, a cBase data set produced by a measure factory execution will include the same number of records (e.g., rows) but more columns that the original source data set before being processed by the measure factory. However, calc factory rules that were not used by any other rule type are removed from the final cBase file; however, the continue to be saved and processed at query time. This reduces memory requirements for storing and processing resulting cBases. It also improves data query performance by a combination of smaller data bases and use of the Spectre data processing engine's highly efficient columnar database processing capabilities. Performing a calc factory rule with a Spectre data processing engine at the time the data is needed results in an improvement in overall computer performance rather than increasing the size of the resulting cBase to store the data for such calc rules.

FIGS. 11-14, depict measure factory data set tables from an exemplary use of the measure factory methods and systems described herein. FIG. 11 depicts a measure factory source data set for charges associated with transactions of a business, such as a hospital. The charges data set of FIG. 11 includes several source rules that are depicted as column headings in this columnar data set including Charge ID, Account ID, Posting Date, Revenue Code, and Charge. FIG. 12 depicts a measure factory accounts data set. This data set includes rules for Account ID, Patient Type, Admit Date, and Discharge Date. FIG. 13 depicts an exemplary lookup rule reference file that may be used to add a Revenue Description to another data set, such as the Charges data set of FIG. 11. In the table of FIG. 13, Revenue Descriptions may be established with an effectivity time-frame that may be defined by dates entered in the _mf_start_date and _mf_end-_date columns for each entry. FIG. 14 depicts an exemplary flag rule table for determining which charges in the Charges data set of FIG. 11 are Newborn Bed Charges. In this example, Revenue Code may be used as a flag key. Charges with revenue code of 170 will be flagged as being a Newborn Bed Charge. Other revenue codes (e.g., 110 and 450) do not get flagged as Newborn Bed Charges in the Charges data set.

Measure factory methods and systems also include automatically generating data processing scripts based on user configured source files and factory rules. One potential approach for converting factory rules into scripts may include determining which data sets have the data required for executing each factory rule. Additionally, each factory rule may be evaluated to determine what data it will produce in each data set. If a factory rule generates a type of data that is not available in any source data set, but that is required by another factory rule, a dependency between the factory rules may be automatically established. This may be accomplished by generating a graph of where data for each factory rule comes from, what data needs to be populated in each data set, and what data needs to be present for generating final measures to be presented in a user interface, such as a dashboard of business performance measures, and the like. Optimization of all data paths throughout the execution of the measure factory instance is not necessary due to the highly efficient Spectre cBase processing technology that is used to execute the generated scripts. Any given set of measure factory data sets may be processed dozens of times (perhaps 50 or more in some instances) through the execution of automatically generated measure factory scripts. The tradeoff of simplicity of user factory rule definition and script generation is worthwhile because of the efficiency of the Spectre data processing engine.

Configuring a measure factory may further include identifying the types of data to be presented in a user interface, dashboard, guided page and the like. Factory rules, source rules, dimensions of the data, and the like may be identified. These aspects may be used as a guide to generation of final cBase data sets that will be used by the user interfaces, and the like.

Configuring a measure factory may further include identifying trends for measures that may be positive or negative. By defining a trend as positive, a dashboard for presenting measures corresponding to the trend may include an indicator that reflects the trend as positive or negative, rather than just as a numeric value. Referring again to FIG. 1, dashboard 110 presents measures as graphics that can reflect a value of a measure on a scale of measure values. Measure 112, for example, may include a variety of ranges for measures that can depict whether the measure represents a positive, neutral, or negative trend.

Referring to FIG. 15 that depicts a table that represents measure configuration and description information, various Inpatient measures for hospital operations are defined. Each measure may be associated with a portion of one or more measure factory dashboards as shown in the dashboards section 1502. Likewise, each measure may be associated with a category 1504. For convenient reference, each measure may be given a measure name 1506. A measure description 1508 may be included to provide a business-centric description of each measure that can be turned into a set of factory rules during a measure factory configuration process.

Figure 16:
FIG. 16 depicts a measure factory executive dashboard.

Referring to FIG. 16 that depicts a measure factory executive dashboard 1602 that provides information for a plurality of measures and with comparisons over various time frames. In the dashboard embodiment of FIG. 16, measures are presented in four categories 1604 with individual trend visual indications 1606, including color coding, such as green for changes over time that fit a preferred trend and red when a measure is following a trend that is not preferred. Additionally, data for a number of time frames 1608 and a visual indicator of the trend of the measure on a trend scale 1610. Measure configuration information and measure factory output data is referenced when generating such a dashboard. An indicator 1612 on the trend scale 1610 is automatically generated based on this information.

Figure 17:
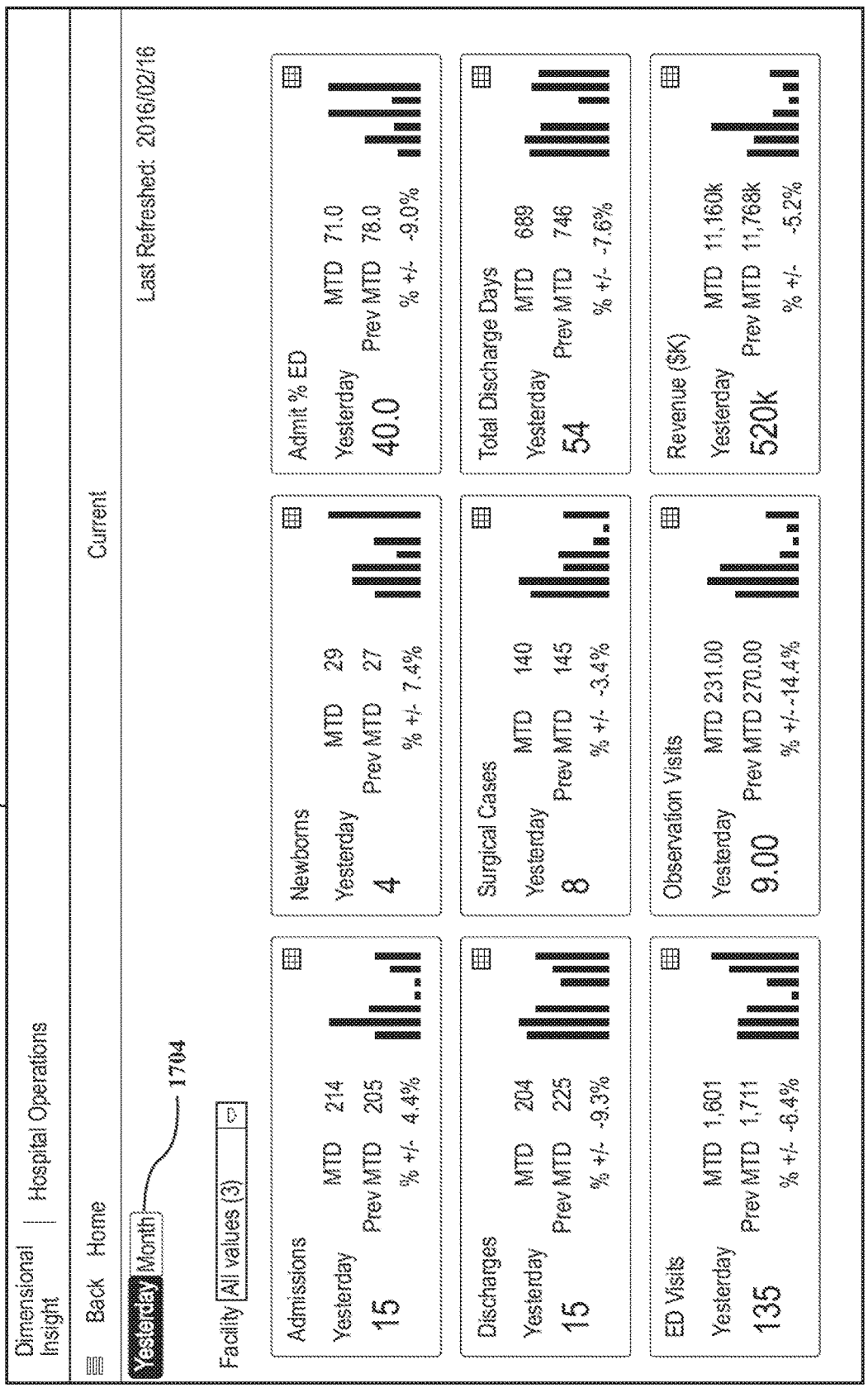
FIG. 17 depicts a dashboard in a user interface of a measure factory for measures based on recent time periods.

Referring to FIG. 17 that depicts a current dashboard 1702 in a user interface of a measure factory for measures based on recent time periods, a current period is presented in bar graph form. The exemplary dashboard of FIG. 17 shows nine measures for a single day time period (yesterday) 1704.

Referring to FIG. 18 that depicts an inpatient table 1802 of measures in a measure factory user interface, a scrollable table includes measures grouped by measure category 1504 for a range of time frames, month to date 1804, current month 1806, and year to date 1808.

Figure 19:
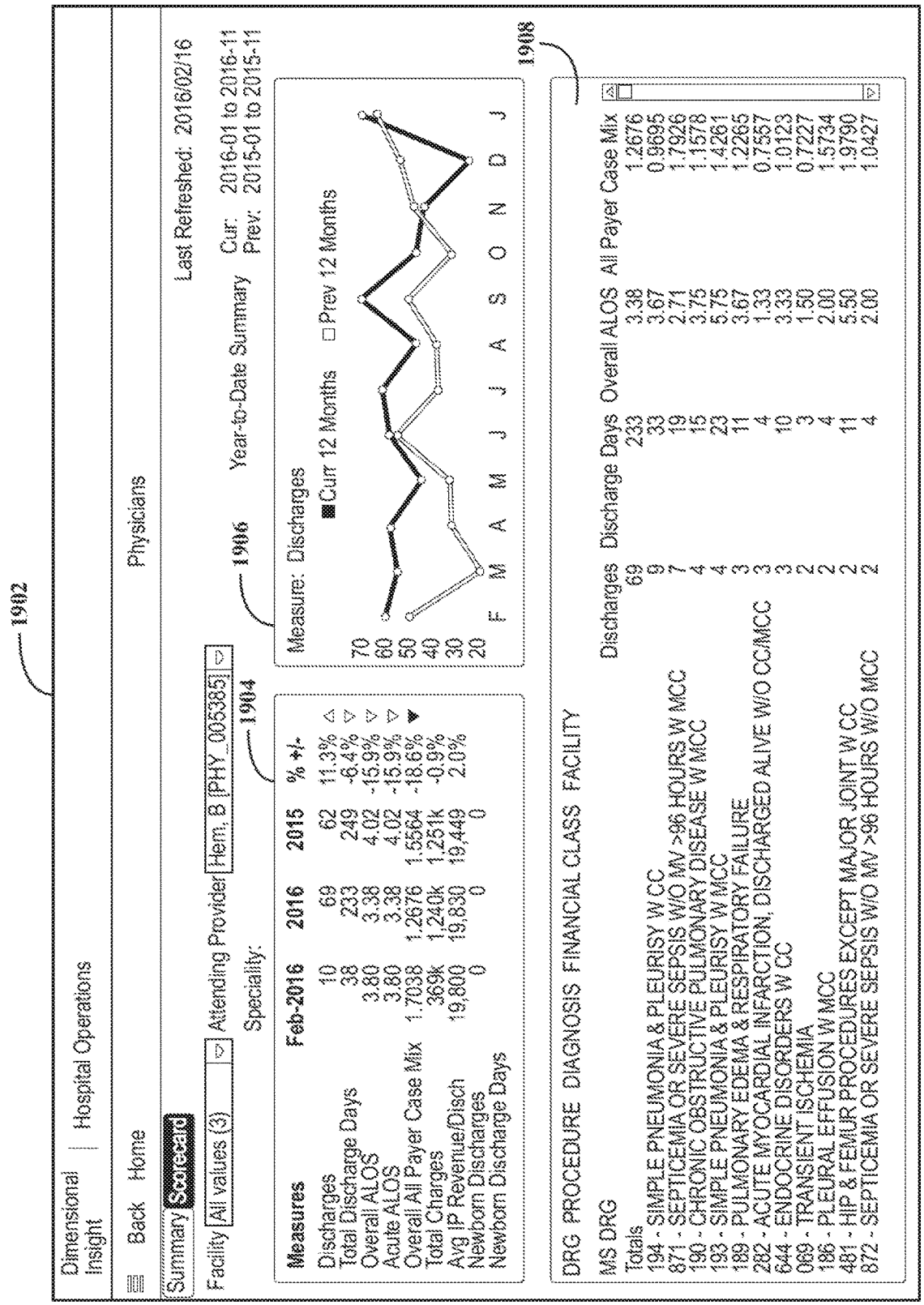
FIG. 19 depicts a multi-view dashboard in a measure factory user interface.

Referring to FIG. 19 that depicts a multi-view dashboard 1902 in a measure factory user interface, several measures for a selected physician are shown in table form 1904, line graph form 1906, and broken down by diagnosis 1908.

Methods and systems for new and novel applications of a measure factory may include automated detection of differences of business-specific performance measures via automated computation of measures by applying source rules and factory rules to business-specific data. The differences may be automatically detected by comparing measures to normalized measures of the same type to identify departures from normal. The normalized measures may be established based on historical averages. They may also be established based on past time periods.

Automated detection of differences and suggestions for sources of data that contribute to the detected differences may be accomplished through a combination of applying the source rules and factory rules as described herein to generate measures that are automatically generated from a user description of the measure, and using a data diving engine that can process the underlying definition and automated scripts that produced the measure to form a structured definition of the measure that identifies the source data, intermediately generated data, and final measures. By processing the elements that make up the measure factory, the data diving engine can pinpoint sources of measures through several iterations of computation. These sources may be original source data files, content added to the source files during measure factory execution, and the like. With this knowledge of the elements and measure factory operations that contribute to the production of measures of business performance, the data dive engine or the like can work through elements to find candidates for explaining the differences in two measures, such as a measure output for two or more time periods (e.g., current period and an earlier period).

As a data dive engine processes the actions that make up the measure of business performance it may arrange the underlying data sources so that those with a greater likelihood of contributing to the difference receive a higher rating as representing a cause of the difference. This may be done through comparing comparable source data for the two measures. As an example, if a measure of a current period is detected as substantively different from a prior period, each data value from the two time periods that contributes to the measure of the two periods may be individually compared.

Merely comparing each pair of data elements could be inefficient and may further result in many candidates. Techniques that target more likely sources of difference may be employed, such as traversing through the computations from the resulting measure backward through the computations, such as by following the script that generated the measure in reverse.

Another approach for detecting candidate sources that impact business performance as determined by comparing two measure factory measure while reducing the computing resources required for this analysis may be to compare values for these time differences while processing the values to generate the final measure. Each difference above a threshold (e.g., a percent change and the like) could be flagged or otherwise logged as a potential candidate. Likewise, as each factory rule computation is performed by the measure factory, the new rule value may be compared for a range of time periods. New rule values that exceed a threshold can likewise be flagged.

Because a measure factory may produce many measures for many different time frames trending may be calculated as part of the measure factory operation. In an example, a factory rule may be configured to generate a trend indicator or quantitative value in data records for later time frames based on data or similar indicators in data records for an earlier time frame. Another way to optimize analysis may be to compare typical time frames, such as month over month, current month to the same month in the prior year, year to date versus same period prior year, and the like.

When a difference between data used to calculate measures is deemed to be likely to be a significant contributor to the end measure differences, it may be captured or marked for further processing. As an example, a loop-type measure factory rule may be used to produce an extended description or other relevant details about the contributing elements. This information may be made available to a dashboard or other output data structure to be presented in an electronic user interface that may facilitate human analysis of the differences.

A data analysis engine for automating detection of differences in measures of business performance may rely on measure factory technology, such as measures that are defined in a measure factory so that relationship among the measures (e.g., sums, ratios, and the like) may be fully defined. Through this definition, all data sources and outputs are setup to allow automated calculation of any measure. By automating a data analysis process, it may be possible to access for analysis and/or presenting in a user interface any underlying detail. The analysis may be characterized by techniques that identify things of interest, such as by detecting large changes period-to-period or departures from detectable patterns and the like. The analysis methods may further automatically identify contributors to the things of interest and present them with relevant context, such as "This is the highest contributor, with a confidence factor of 'x'. This is the next highest contributor, with a confidence factor of 'y'." The result could be presented in an executive dashboard that is configurable based on the measures and detected differences so that the candidate sources with greatest impact may be made most visible to the user. Alternatively, the dashboard could be configured so that information presented could be based on the user's role (e.g., a financial person looking at the sources of differences versus a line manager looking at the sources of the differences).

Figure 20:
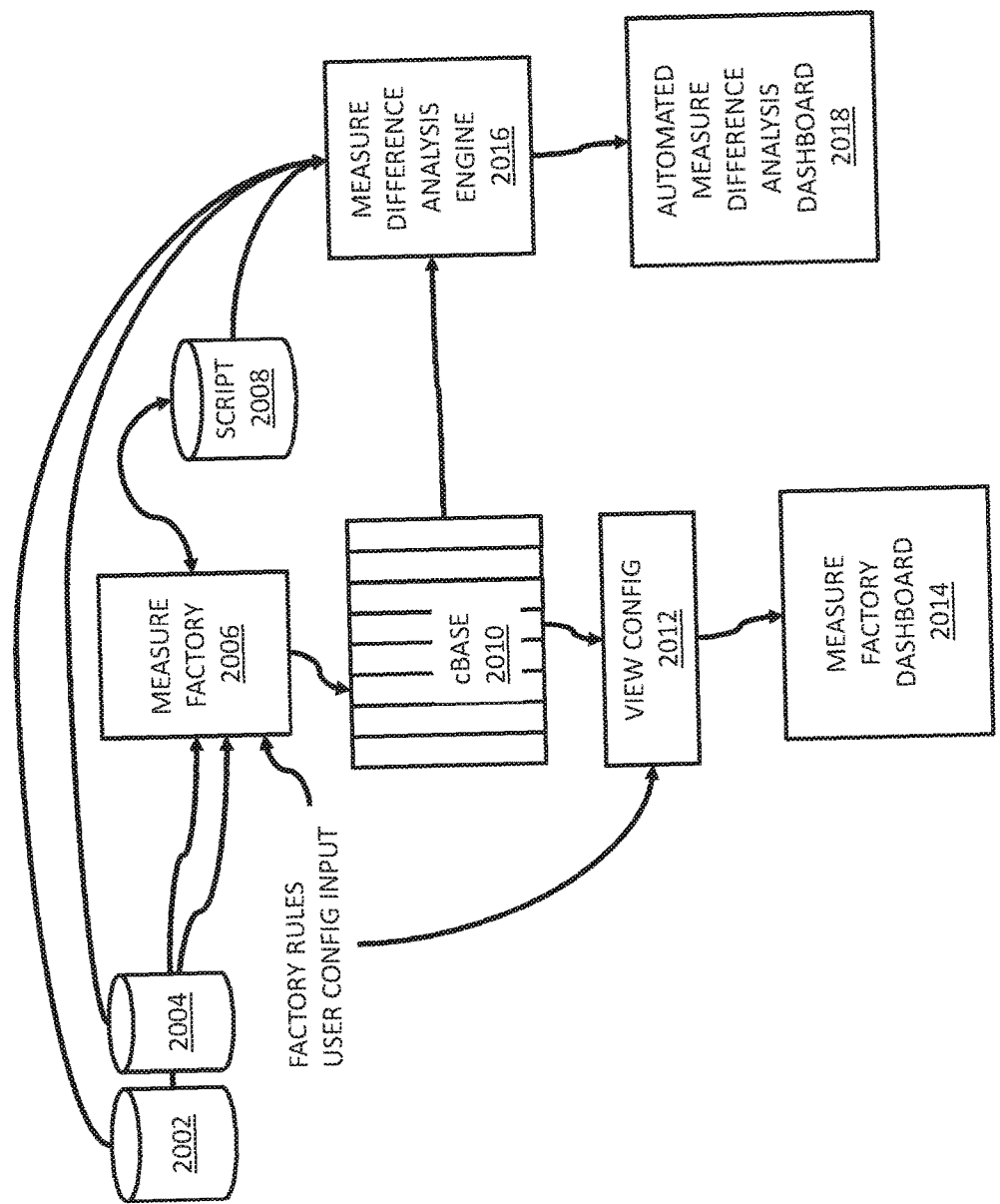
FIG. 20 depicts an application of a measure factory for automated analysis.

Referring now to FIG. 20 that depicts a diagram of systems elements for measure difference automated analysis. Data sources 2002 and 2004 may be input to a measure factory 2006 and processed according to factory rules and user configuration input that have been transformed by the methods and systems described herein to a measure factory script 2008. The measure factory 2006 produces a columnar database cBase 2010 that may include one or more rules (e.g., columns) that contain difference impact indicators for rows of data. As described herein, these indicators may be generated by the measure factory while processing the source data to produce measures. The user configuration information may be used to produce a view 2012 of the cBase 2010 that results in a measure factory dashboard 2014. A measure difference automated analysis engine 2016 may process the cBase 2010 along with the script 2008 and source data 2002 and/or 2004 as described herein to produce an automated measure difference analysis dashboard 2018 as described herein.

Embodiments of the present disclosure may include computer-automated disclosure of at least one variance-impacting dimension among a plurality of dimensions of data that contribute to a measure of business performance of business activities that are represented at least in part by the data. As the relevant dimensions of data relevant to a business increase, the potential measures (representing combinations of multiple measures) increase exponentially. Accordingly, no human can possibly evaluate all of the measures that are potentially relevant to a business. As a result of the impossibility of calculating or reviewing even a small fraction of the possible measures, businesses typically define a relatively small subset of common measures, which may or may not reflect important events or trends that are relevant to the business. However, potentially relevant measures can be identified by a computer-automated process that is based on calculated statistics with respect to individual dimensions or facts that are used to generate measures and/or the measures that are created by performing calculations on such measures. Such variances may include variances between defined time periods, variances that are based on some normalization of a measure (such as based on historical calculations of that measure), or the like. In embodiments, detection of a variance may comprise determining data that contributes to the measure of business activity; comparing differences between at least one of calculations on determined data, summaries of the determined data and elements of the determined data for a plurality of varying (e.g., time-period-specific) measures; ranking at least a plurality of the differences (e.g., from largest to smallest of the plurality of the differences); and presenting at least one of descriptive data for a selected top number of ranked differences and a selected top number of measures with respect to which differences were largest to a user in an electronic user interface of a computer. In embodiments, the user interface may facilitate selecting one more of the plurality of varying (e.g., time-period-specific) measures, such as to obtain further information about the data and/or dimensions that relate to the measure. For example, a business, such as a health care facility, may track many types of information, such as admissions, re-admissions, beds occupied, diagnoses, insurance information, and the like. A measure like occupancy might be reviewed and compared to occupancy for prior time periods, such as the prior week, the same week the preceding year, and the like, and trends might be observed by a human user. However, occupancy of a health care facility may result from a vast array of underlying factors, such as admissions, discharges, diagnoses, births, deaths, and the like, each of which may have a large number of causal factors, such as diseases conditions, economic conditions, environmental conditions, seasonal conditions, and the like. A given level of occupancy may also result in a wide range of financial outcomes for a hospital, as the extent of insurance coverage, the nature of the conditions treated, and other factors can be important. The financial outcomes are similarly multi-dimensional. As a result, looking at a simple measure such as occupancy may provide very little insight into the real business of the operation of a hospital. High occupancy may result in outstanding financial gains, or catastrophic losses, depending on the patient mix. Stable occupancy may indicate a stable environment, or it may be a coincidental result of two opposing trends, such that a change in one of the trends might radically shift the business in a future time period. While a human user cannot possibly evaluate all of the possible causes and effects, a measure factory may, using computer automation, calculate a wide range of potential measures, such as measures involving the contributing elements that result in a higher-level measure like occupancy. Once those measures are calculated, variances (such as over time), of the potentially contributing measures can be used to surface ones that appear unusual, such as possibly reflecting events that bear further analysis. For example, a large increase in the number of patients diagnosed with a serious infectious disease between time periods (e.g., compared week-to-week or for the same week a year before), such as drug-resistant staph infection, would be automatically detected by an automated measure factory generation and variance calculation engine and surfaced to an analyst, even if other measures, such as occupancy rates, remain stable, such as because of favorable trends in other, less threatening diseases.

In embodiments, such methods and systems for automation of a measure factory may include automatically ranking by degree of impact, business-relevant data dimensions and measures that contribute to business measures (and thus may impact a change in business performance), including detecting such dimensions and measures by automated comparison of a plurality of distinct time period-specific measures or dimensions of business performance. Such a process may be applied to the measures generated by processing (such as for a measure factory as disclosed herein) many-dimensional data representing potentially causal factors relating to the activities of a business or other enterprise and/or representing outcomes of such causal factors. In embodiments, processing with a measure factory may further include applying data processing scripts to data representing dimensions relating to business activities or measures, the scripts automatically generated from a plurality of factory rules described as relationships of source rules and relationships of other factory rules; a plurality of data sets comprised of data representing the business activities arranged as a columnar array wherein each column is associated with a distinct source rule; and a factory rule execution hierarchy that executes ready factory rules without dependency on other factory rules before executing ready factory rules with dependency on other factory rules. In embodiments, a "ready calc" factory rule is applied before other factory rules, so that measures that are ready for calculation can proceed, and a ready flag rule is applied after all ready calc rules have been applied to a given data set. Calculation of all ready-for-calculation measures can proceed until all possible calculations are performed. Thus, measures may be serially generated based on readiness for calculation, such that they may be dynamically presented for analysis based on which ones, at a given time, appear to constitute measures of interest, such as based on the variances (e.g., period-over-period) noted above. In embodiments a hierarchy of factory rule execution indicates an order of factory rule execution. In embodiments, the hierarchy may be based in part on the nature of the measures calculated, such as commencing execution on rules that involve measures that have been determined in recent time periods to include dimensions of interest (such as involving significant variances that may reflect business-relevant events). In embodiments, the order of factory rule execution may respond to a ready-for-calculation flag and may lookup such rules to execute before executing "ready link" rules, which in turn may execute before "ready plugin" rules. In embodiments, factory rules that apply only to data within a specific data set may be executed independently of factory rules that apply to data within other data sets.

In embodiments, automated identification of dimensions and measures of interest, based on performing calculations on many dimensions that potentially contribute to measures of interest, and storing and ranking measures using time-period variances or other statistics may enable various business relevant analytic activities that were not previously possible. This may include projecting a change in a business performance measure based on analysis of differences over time of contributing data elements that, when processed through a measure factory, are used to calculate the business performance measure. For example, a business measure that appears stable may be projected to change based on discovery of an event in a contributing measure that is likely to have later influence on the higher-level measure. For example, if a hospital has had stable occupancy, but a measure of the diagnoses (disease conditions) of current patients indicates a high increase in the fraction of easily treatable conditions (when divided by all conditions), then an analyst may project a decrease in occupancy that would not have been found without the computer-automated calculation of many such measures. Such projections may also be performed automatically, such as using change in underlying measures to identify measures for which projections should be performed, automatically performing the projections, and automatically ranking, presenting, or highlighting projections that vary significantly from normal patterns for the applicable business measures.

Other uses of the analytic system may include suggesting a dimension, a measure, and/or a business-relevant event or activity as a source of a variance between two business-centric performance measures of a business, where the measures that suggest the variance are automatically generated by processing (such as with a measure factory, such as using automated processing rules noted herein) many-dimensional data representing activities of the business. Similarly, the methods and systems disclosed herein may enable suggesting an event that is characterized by data within a data set as a source of a variance between two business-centric performance measures of a business, where the measures are automatically generated by processing (such as with an automated measure factory according to the various embodiments disclosed herein) data representing activities of the business.

Measures of interest, projections, events, dimensions, facts, summaries and the like that are identified by automated analysis (such as time-variance analysis) of automatically generated and calculated measures (such as in a measure factory approach described throughout this disclosure), may be displayed in a dashboard, such as an operational dashboard for a business or other enterprise that automatically presents one or more such results. This may include, for example, contributors to notable variances of a measure of business performance (such as over time), where the contributors may be determined from sources of measures as defined by a set of factory rules of a measure factory, the contributors may be tagged with a variance-impact confidence factor, and the dashboard may be automatically configured based on a determined role of a user of the dashboard. The operational dashboard may automatically re-configure to show the most relevant measure of interest, not only based on the role of the user, but based on variances described above, such as in the underlying data that is used to calculate one or more measures. In embodiments, contributors to measures may be further automatically filtered based on the determined role of the user, so that sources of data for contributors associated with the determined role of the user are represented in the dashboard (such as by descriptive information about role-specific business activities) that correspond to the sources of data for the filtered contributors. For example, a doctor may be presented with measures, projections, or the like where contributing data indicates high variances in data about disease conditions, diagnoses, patient outcomes, and the like, while a financial operator may be presented with information about measures, projections, events, or the like that involve time-variances in contributing data about occupancy rates, insurance, re-admissions, and the like.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A method comprising:
    detecting changes in business activity-specific performance measures by automated computation of measures by applying source rules and factory rules to business-specific data sets in a series of automated operations under control of a processor in a measures factory, the operations automatically generated from:
    the factory rules, wherein a portion of the factory rules are described as relationships of data set-specific source rules and relationships of other factory rules;
    the source rules;

the business-specific data sets arranged as a columnar array, wherein each column is associated with a distinct source rule;

a factory rule execution hierarchy that requires a ready flag rule to be applied after all ready for calculation rules have been applied to a given data set, and for the given data set, ready for calculation, flag, and lookup rules apply before ready link rules which apply before ready plugin rules; and automatically ranking by degree of impact, business activities that impact a change in business performance detectable from a comparison of a plurality of distinct time period-specific measures of business performance, the measures generated by processing with the measures factory data representing the business activities for the plurality of time periods.

2. The method of claim 1, wherein computed measures are compared to normalized measures of a same measure type to identify departures from normal.

3. The method of claim 1, wherein normalized measures are established based on historical averages.

4. The method of claim 1, wherein normalized measures are established based on a past time period.

5. The method of claim 1, wherein the automated detection comprises detection of at least one variance-impacting dimension of a plurality of dimensions of data in the business-specific data sets that contributes to a measure of business performance of business activities that are represented at least in part by the data.

6. The method of claim 1, wherein detection further comprises:
 determining data that contributes to the measure of business performance;
 comparing differences between at least one of summaries of the determined data and elements of the determined data for a plurality of varying, time-specific measures;
 ranking at least a plurality of the differences from largest to smallest of the plurality of the differences; and
 presenting descriptive data for top ranked differences to a user in an electronic user interface of a computer.

7. The method of claim 6, wherein the user interface facilitates selecting the plurality of varying measures.

8. The method of claim 7, wherein the varying measures are time-period specific.

9. The method of claim 1, wherein factory rules that apply only to data within a specific data set are executed independently of factory rules that apply to data within other data sets.

10. The method of claim 1 further comprising: projecting a difference of a business performance measure based on analysis of differences over time of data elements that, when processed through the measure factory, produce measures of the business performance.

11. The method of claim 1 further comprising, suggesting a business activity as a source of a variance between two business-centric performance measures of a business, the measures generated by processing data representing activities of the business with the measures factory.

12. The method of claim 1, further comprising configuring a business operational dashboard that automatically presents contributors to notable variances of a measure of business-performance, the contributors determined from sources of measures as defined by a set of factory rules of the measure factory, the contributors tagged with a variance-impact confidence factor, the dashboard automatically configured based on a determined role of a user of the dashboard.

13. The method of claim 12, wherein the contributors are further filtered based on the determined role of the user so that sources of data for contributors associated with the determined role of the user are represented in the dashboard by descriptive information about role-specific business activities that correspond to the sources of data for the filtered contributors.

* * * * *

UNITED STATES PATENT AND TRADEMARK OFFICE
CERTIFICATE OF CORRECTION

PATENT NO. : 10,839,327 B2
APPLICATION NO. : 15/856542
DATED : November 17, 2020
INVENTOR(S) : James Clark et al.

Page 1 of 1

It is certified that error appears in the above-identified patent and that said Letters Patent is hereby corrected as shown below:

In the Specification

In Column 6, Line 64, delete "Type") "Inpatient"" and insert -- Type")="Inpatient" --, therefor.

Signed and Sealed this
Twenty-ninth Day of December, 2020

Andrei Iancu
*Director of the United States Patent and Trademark Office*